United States Patent
Von Der Ohe

[11] 3,894,602
[45] July 15, 1975

[54] WHEEL SUSPENSION

[75] Inventor: Manfred Von Der Ohe, Stuttgart, Germany

[73] Assignee: Daimler-Benz Aktiengesellschaft, Germany

[22] Filed: Apr. 23, 1973

[21] Appl. No.: 353,748

[30] Foreign Application Priority Data
Apr. 24, 1972 Germany.................... 2220072

[52] U.S. Cl......... 180/43 R; 180/73 D; 280/96.2 R; 267/57
[51] Int. Cl............................................. B60v 11/18
[58] Field of Search .... 180/73 C, 73 R, 73 A, 73 B, 180/71, 73 D, 73 TT, 43 R; 280/124 B, 96.2 R; 267/57, 57.1

[56] References Cited
UNITED STATES PATENTS

| | | | |
|---|---|---|---|
| 2,226,047 | 12/1940 | Borgward....................... | 180/73 R |
| 2,757,017 | 7/1956 | Matthias et al................. | 180/73 D X |
| 3,149,690 | 9/1964 | Rosenkrands et al. .......... | 267/57 X |
| 3,174,771 | 3/1965 | Muller........................... | 180/73 R X |
| 3,195,670 | 7/1965 | Dunn............................. | 180/73 R |
| 3,205,967 | 9/1965 | Stotz et al...................... | 180/73 TT |
| 3,573,882 | 4/1971 | Van Winsen.................... | 180/73 R |

*Primary Examiner*—Kenneth H. Betts
*Attorney, Agent, or Firm*—Craig & Antonelli

[57] ABSTRACT

A wheel suspension for the oppositely disposed wheels of an axle of a motor vehicle which includes an upper and a lower guide means for each wheel carrier thereof, whereby, for example, the lower guide means are constituted by mutually independent guide members and the upper guide means are constituted by a cross connection and by guide members in the form of a triangular guide members coupled with each other by the cross connection; during unidirectional spring movements of the oppositely disposed wheels the guide means thereof which include the cross connection and the guide members coupled by this cross connection, have a substantially horizontal axis of rotation disposed in a vehicle cross plane and common to both axle sides whereas during oppositely directed spring movements of the oppositely disposed wheels, an axis of rotation is formed for each axle side by the guide means including the cross connection and the guide members coupled thereby, which is determined by the points of pivotal connection of the associated guide member on the frame-side and is disposed at an angle to the common axis of rotation; the cross connection thereby includes a cross bearer which is rotatable about an axis fixed at the vehicle frame and disposed in a vehicle transverse plane, and connecting arms adapted to be torsionally stressed with respect to the cross bearer member and connected to the guide members; the points of pivotal connection on the frame-side of the guide members which are operatively connected to the cross connection and of which at least the inner point of pivotal connection located nearer the vehicle longitudinal center plane is provided at the cross bearer, are located in straight lines extending obliquely to the axis of rotation of the cross connection as viewed in rear view, and constituting the axes of rotation of the guide members for the oppositely directed spring movements.

111 Claims, 15 Drawing Figures

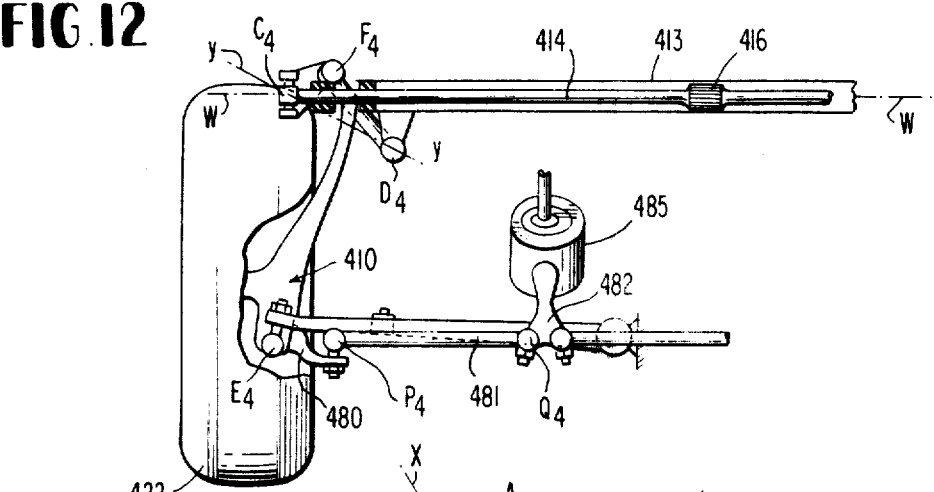
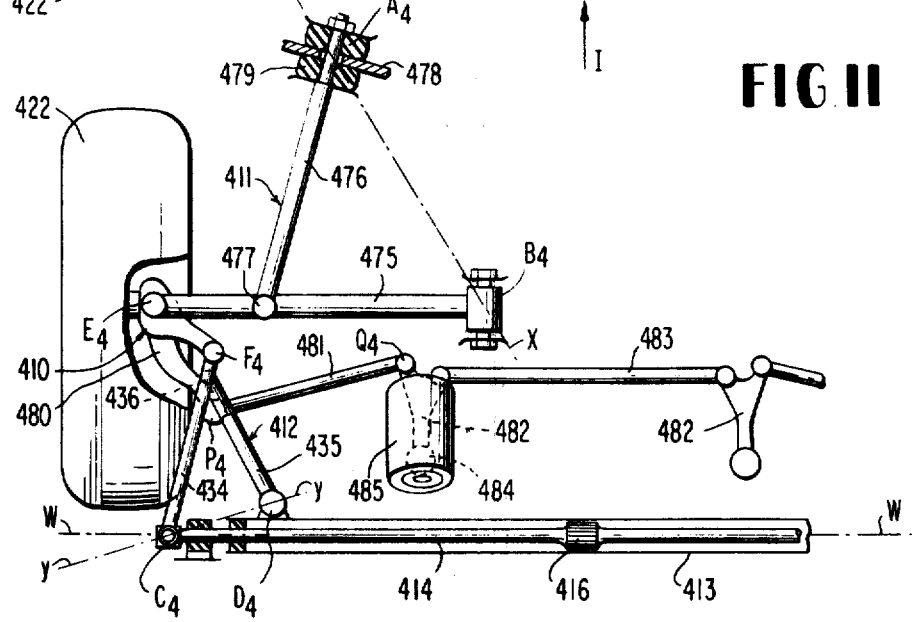
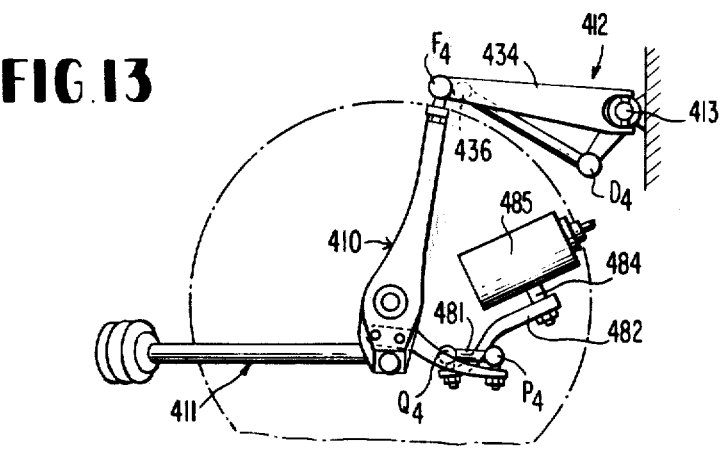

WHEEL SUSPENSION

The present invention relates to a wheel suspension for the mutually oppositely disposed wheels belonging to an axle of a motor vehicle, especially of a passenger motor vehicle, in which upper and lower guide means for the wheel carriers guided as coupler are coordinated to each side of the axle, of which the guide means associated with respectively mutually oppositely disposed axle sides and corresponding to one another are constituted by mutually independent guide members and the other guide means are constituted by a cross connection and by guide members in the form of triangular guide members coupled with each other by this cross connection, whereby these guide means are so constructed and arranged that during unidirectional spring movements of the mutually oppositely disposed wheels the guide means thereof which include the cross connection and the guide members coupled by this cross connection, have a horizontal axis of rotation common to both sides of the axle and disposed in a vehicle transverse plane, and in that during oppositely directed spring movements of the mutually oppositely disposed wheels one axis of rotation each is formed for each axle side by the guide means including the cross connection and the guide members connected by this cross connection, which is determined by the points of pivotal connection of the associated guide members on the frame side and is disposed at an angle to the common axis of rotation given during unidirectional spring movements.

In a known wheel suspension of this type, the cross connection is constituted by a connecting member which has the shape of a wide, horizontally disposed U, whose legs are connected with the mutually oppositely disposed wheel carriers in mutually corresponding points of pivotal connection. The connecting member is connected with two triangular guide members within the area of its web which is disposed perpendicularly to the vehicle longitudinal center plane and extends horizontally in the normal position, and more particularly in points of pivotal connection which are provided respectively within the area near the wheel symmetrically to the vehicle longitudinal center plane and which in case of unidirectional spring movements of the wheels are so stressed with respect to each other by the web connecting the same that they are blocked against a pivoting about their axes of rotation. A common axis of rotation results therefrom for unidirectional spring movements for those guide means of the wheel carriers which include the triangular guide members coupled by the connecting member, and this axis of rotation coincides with a straight line extending at the connecting member through the points of pivotal connection of the triangular guide members coupled by the connecting member. In contradistinction thereto, in case of oppositely directed spring movements, a free movability of the triangular guide members coupled by the connecting member is provided about the axes of rotation thereof, and this is achieved in practice by the prior art construction in that a corresponding yielding suport of the mentioned triangular guide members is realized in the points of pivotal connection thereof on the frame side. This elastic support is necessary by reason of the kinematics, which are not accurate and exact in the prior art construction, and leads to a non-precise guidance of the wheel carriers guides as coupler at least in those points of pivotal connection in which the wheel carriers are guided by the guide means including the connecting member and the triangular guide members. Furthermore, this prior art construction is also unfavorable as regards the camber changes occurring during spring movements by reason of the arrangement of the guide means for the wheel carriers which are constituted only by triangular guide members serving as cross guide members.

In contradistinction thereto, a wheel suspension is to be provided by the present invention which, with a precise, kinematically exact wheel guidance, assures an at least nearly constant wheel camber with respect to the road surface as well as a constant track width, and more particularly both during unidirectional as also during oppositely directed spring movements, and which makes it possible to achieve a starting-and braking-nose-diving compensation far-reachingly independent of the load, possibly even in excess of 100%, to keep small the unsprung masses and to realize also an accurate track steering. In particular, a wheel suspension is to be provided also by the present invention which excels by a compact and in particular essentially flat type of construction, notwithstanding the aforementioned properties, in order to avoid as much as possible limitations as regards the useful interior space and the engine arrangement.

According to the present invention, this is achieved with a wheel suspension of the aforementioned type by the features that the cross connection includes a cross bearer rotatable about a horizontal axis fixedly arranged with respect to the frame and disposed in a vehicle transverse plane and outrigger or connecting arms connected with the guide members and elastically torsionally stressable with respect to the cross bearer member in relation to its axis of rotation, and in that the points of pivotal connection of the guide members on the frame-side, which are arranged at the cross connection and of which at least the respective inner points of pivotal connection disposed nearer to the vehicle longitudinal center plane are provided at the cross bearer, are disposed for each guide member on a straight line extending obliquely to the axis of rotation of the cross connection, as viewed in rear view, which straight line forms the axis of rotation of the guide member for oppositely directed spring movements.

The solution according to the present invention combines in itself the advantages of known double-guide- and longitudinal-guide axles, and more particularly with the avoidance of the respective disadvantages thereof. This is demonstrated at the outset by the fact that in case of unidirectional and oppositely directed spring movements, the camber of the wheels can be kept constant with respect to the road surface. Furthermore, it is possible within the scope of the solution according to the present invention to maintain constant the track width during unidirectional and oppositely directed spring movements which has a favorable effect, inter alia, on the wear of the tires. Furthermore, a starting and braking nose-diving compensation which is far-reachingly independent of loads, possibly even in excess of 100%, can be achieved within the frame of the solution according to the present invention.

In addition to maintaining constant the camber, the solution of the present invention enables with only slight additional expenditures also maintaining constant the respectively selected track, i.e., toe-in or toe-out, so that undesirable steering effects are precluded.

Notwithstanding these many advantages attainable by the wheel suspension of the present invention, this wheel suspension offers a relatively small and in particular flat construction. Additionally, it can also be well controlled from a constructive point of view and enables different types of constructions which are particularly favorable from a manufacturing and assembly point of view. The fact significantly contributes thereto that the points of pivotal connection on the frame-side of the guide members coupled by way of the cross connection are all provided at the cross connection and that the cross connection acts simultaneously as stabilizer.

With a view toward maintaining constant the camber of the wheels with respect to the road surface as attainable by the present invention, as well as with a view toward smallest possible positive caster changes, it is appropriate to guide the wheel carriers guided as couplers in their respective points of pivotal connection at the guide means constituted by the mutually independent guide members, by means of these guide members in such a manner that the points of pivotal connection move during spring movements on approximately vertical paths. Impairments or limitations as regards the camber constancy of the wheels with respect to the road surface can be excluded already far-reachingly according to the present invention in that the movement paths of the points of pivotal connection on the wheel-carrier side of the guide means constituted by the mutually independent guide members extends at least essentially in vertical vehicle longitudinal planes. Such a guidance of the points of pivotal connection of the mutually independent guide members at the wheel carrier enables a particularly favorable arrangement of these guide members as regards the overall construction, especially with rear wheel suspensions.

In one prior art wheel suspension which represents a combination of inclined and longitudinal guide axles, and which is intended in particular for the rear wheels of motor vehicles, the guide members rigidly connected with the wheel carriers, which are rotatable as inclined guide members about axes disposed obliquely to a vehicle transverse plane, are pivotally connected with the inner points of pivotal connection thereof, i.e., with the points of pivotal connections thereof adjacent the vehicle longitudinal center plane, at lever arms which are rigidly connected with a shaft extending a horizontal and vehicle transverse direction and which extend approximately in the vehicle longitudinal direction. A further upright lever arm is provided at the shaft whose axis of rotation extends through the outer points of pivotal connection of the inclined guide members fixed with respect to the frame, which further upright lever arm forms the pivot axis for a scale-beam, which is pivotally connected to upwardly projecting extensions of the outer guide arms of the inclined guide members. This type of realization of the known construction has initially as a consequence a relatively great structural height thereof. Consequently, particularly since this prior art construction involves a longitudinal-inclined guide axle, the design and layout of the wheel suspensions is rendered difficult and an optimum space utilization for the vehicle passenger interior space is impaired. These disadvantages appear in particular with vehicles having a forwardly disposed engine and driven rear wheels. Furthermore, it is disadvantageous with the known wheel suspension that it is practically unusable for front axles, that unfavorable loads and stresses of the structural parts result, that the track, by which term is to be understood either toe-in or toe-out, can be controlled only with great difficulties in case of alternate spring movements and that a starting support independent of load and loading is not possible.

The elastically torsionly stressable connection between the connecting arms and the cross bearer is established according to the present invention by way of torsion elements which in one embodiment according to the present invention may be constituted by spring elements, especially annular spring elements non-rotatably arranged with respect to the cross bearer, or according to another embodiment of the present invention by rubber elements, especially rubber ring elements. Such torsion elements may be arranged surrounding the cross bearer ring-shaped or also in axial extension thereof, whereby they either adjoin directly the cross bearer or are connected with the same by the way of an intermediate member. A particularly appropriate construction according to the present invention resides in constructing the torsional elements by torsion rods extending in the axial direction of the cross bearer.

Especially with the use of torsion rods as torsion elements it is appropriate to provide a hollow cylinder, especially a pipe as cross bearer since large elastic deformation paths for these torsion rods and a good space utilization can be achieved in a simple manner with an at least partial arrangement of the rod-shaped torsion elements within this hollow cylinder.

Within the scope of the present invention, it is of course also possible to utilize torsion elements which are respectively constituted, for example, by a torsion rod and by a torsion rubber element which may be provided either in the connection of the torsion rod with the cross bearer or also in the connection of the torsion rod with the connecting arm.

If torsion rods are used as torsion elements, then their non-rotatable connection with respect to the hollow cylinder may be achieved in a particularly appropriate manner by serrations or splined connections which establish the connection between the end of the respective rod disposed within the hollow cylinder and the hollow cylinder itself.

A particularly appropriate construction and design for the torsion elements resides within the frame of the present invention in constituting the torsion elements as a structural unit by a one-piece torsion rod which is fixed within the area of the vehicle longitudinal center plane with respect to the hollow cylinder through which the unitary torsion rod extends. Also with this solution, the use of serrations is particularly appropriate for the non-rotatable fixing between the hollow cylinder and the torsion rod.

It is appropriate in the realization of the present invention for the fastening of the guide means which include the guide members and the cross connection with respect to the vehicle frame, to rotatably support the cross bearer and the torsion elements arranged coaxially thereto in unison with respect to the vehicle frame. In its most simple manner, this common support rotatable in relation to the vehicle frame of the torsion elements and of the cross bearer can be achieved in that one bearing support each is provided coordinated to each axle side. If the torsion elements are constituted by torsion rods or by a continuous torsion rod, then the bearing supports are appropriately provided at the torsion rods or at the torsion rod within the area that is disposed axially outside of the cross bearer.

An embodiment within the frame of the present invention which is particularly advantageous from a constructive point of view consists in making the connecting arms as components of the guide members constructed as triangular guide members, which is achieved in a simple manner in that of the two points of pivotal connection on the frame-side of the guide members coupled with each other by the cross connection and constructed as triangular guide members, the respective outer point of pivotal connection which is disposed farther removed from the vehicle longitudinal center plane is connected with the associated torsion element whereas the inner point of pivotal connection which is disposed nearer the vehicle longitudinal center plane is arranged at the cross bearer. The pivotal connection between the guide member and the torsion element can take place appropriately by one joint connection each which lies on the axis of rotation of the cross connection and is non-rotatable with respect thereto.

If the connecting arms are constituted by parts of the triangular guide members serving as guide members, then it is appropriate to use triangular guide members whose arms are pivotally connected with each other in one point in order to preclude stresses in and twisting of the triangular guide members.

A further appropriate solution within the scope of the present invention consists in connection with rod-shaped torsion elements and two-armed guide members constructed as triangular guide members, in constituting the arm of the triangular guide member which is connected with the torsion element, by an end portion of the rod-shaped torsion element bent out of the axis of rotation of the cross connection.

It is, of course, possible within the scope of the present invention to provide at the cross bearer the two points of pivotal connection on the frame-side of the guide members coupled with each other by the cross connection and constructed as triangular guide members. Also in this type of construction, the additional cross connection between the triangular guide members may take place by way of torsion elements provided at the cross bearer and connecting arms starting from these torsion elements. An inherently rigid transmission element which is pivotally connected with the connecting arm and/or the guide member is thereby appropriately provided between connecting arm and guide member in order to avoid twisting and stresses. Furthermore, also with this construction, the connecting arm may be constituted by a lever non-rotatably arranged at the torsion element in relation to the axis of rotation thereof. With a rod-shaped construction of the torsion element, there additionally exists also the further possibility according to the present invention to constitute the connecting arm in each case by a bent-off end section of the torsion element.

In order to assure also a good driving comfort with a wheel suspension constructed according to the present invention, it is appropriate to construct the support for the cross connection including the cross bearer or the cross bearers and the stabilizer, on which are provided the points of pivotal connection of the guide members on the frame-side, relatively soft with respect to the vehicle frame in relation to the vehicle longitudinal direction. With a view thereto as also with a view to manufacturing conditions, it is appropriate especially with vehicles which are equipped with a wheel suspension according to the present invention for the driven rear wheels thereof, if the connection including the cross bearer or the cross bearers and stabilizer is supported at an auxiliary bearer which is connected in its center area with the differential gear provided in the drive connection for the rear wheels and which, together with the differential gear is supported relatively soft in at least three points with respect to the vehicle frame.

It is possible within the frame of the present invention to provide the guide means constituted by the guide members and the cross connection as upper or also as lower guide means for the wheel carriers. If the guide means are provided as upper guide means for the wheel carriers, then it is appropriate with a view toward the aimed-at camber constancy with respect to the road surface, if the points of pivotal connection of the guide members on the frame-side which determine the position of the associated axis of rotation of each guide member for the alternate or oppositely directed spring movements, extend respectively obliquely downwardly toward the vehicle longitudinal center plane as viewed in rear view. Viewed in plan view, it is appropriate to so locate these points of pivotal connection that the axes of rotation of the guide members extend respectively obliquely forwardly toward the vehicle longitudinal center plane. Such a position of the axes of rotation can be achieved in particular in that the inner points of pivotal connection on the frame-side of the guide members constructed as triangular guide members are provided respectively below the cross connection.

If the guide means constituted by the guide members and by the cross connection are provided as lower guide means for the wheel carriers, then it is appropriate with a view toward the aimed-at camber constancy with respect to the road surface, if the points of pivotal connection on the frame-side which determine respectively the position of the axis of rotation of the associated guide member for alternate spring movements, extend obliquely upwardly toward the vehicle longitudinal center plane as viewed in rear view. As viewed in plan view, an extension of the axis of rotation of the guide members obliquely rearwardly toward the vehicle longitudinal center plane is aimed at in this embodiment. This is attainable in an appropriate manner in that the inner points of pivotal connection on the frame-side of the guide members constructed as triangular guide members are provided above the cross connection.

With a view toward the aimed-at starting and braking nose-diving compensation, it is appropriate if the lower guide means of the wheel carriers guided respectively as coupler form the respectively forward guide means for the wheel carriers in relation to the vehicle longitudinal direction.

In addition to the described positions and locations of the axis of rotation for the guide members coupled with each other by the cross connection, which are possibly within the scope of the present invention and are appropriate therefor, it is appropriate in particular for rear wheel suspensions if the axes of rotation of the guide means constituted exclusively by guide members, extend approximately horizontally. In addition to a horizontal extension, also a location of these axes of rotation transversely to the vehicle longitudinal direction is to be aimed at with rear wheel suspensions, and more particularly perpendicularly to the vehicle longitudinal direction.

In particular with front wheel supsensions, the axes of the lower guide means constituted exclusively by guide members may extend with advantage obliquely forwardly and outwardly or, under certain circumstances, may be constructed even as pure cross guide members insofar as sufficiently large lengths for the guide members can be realized.

Since with the wheel suspension according to the present invention in which the wheel carrier is guided as coupler, the guide means including the guide members and cross connection have different axes of rotation for unidirectional and oppositely directed spring movements, a track steering which assures a constancy of the respectively selected toe-in or toe-out, to be referred to hereinafter for sake of brevity merely by "track", proves as particularly difficult, and it is therefore a further aim of the present invention to provide a track steering for such wheel suspensions which assures an at least approximate constancy of the respectively preselected track independently of the respective spring position so that a wheel suspension results in which the camber with respect to the road surface, the track and track width are kept constant during both unidirectional as also oppositely directed spring movements.

The desire to maintain constant the track during unidirectional and also during oppositely directed spring movements, aimed-at according to the present invention, is achieved initially in partial good approximation according to the present invention in that a track link steering arm rigidly connected with the wheel carrier is coordinated to each of the wheel carriers of the axle which are guided as couplers by the guide means; the track link steering arm is thereby connected with a tie-rod or track rod in a point of pivotal connection that lies at the height of the point of pivotal connection on the wheel-carrier side of the guide member that belongs to one of the guide means constituted by guide members and cross connection, and lies together with the same in a vehicle cross plane; the track rod, as viewed in side view, extends in approximately the same direction in relation to the corresponding guide member while its point of pivotal connection on the frame-side opposite the track link steering arm lies within the area of the axis of rotation of this guide member during oppositely directed spring movements and is coordinated to the cross bearer.

A track steering system which is constructed in such a manner, results in an exact and accurate track steering during unidirectional spring movements in conjunction with the fact that with the wheel suspension according to the present invention the wheel carrier is guided during unidirectional spring movements like a double-longitudinal guide axle. Therebeyond, also for oppositely directed spring movements, favorable values can be achieved with the described arrangements as regards the desire to maintain constant the track, and more particularly by reason of the fact that for the oppositely directed spring movements an approximately identical starting position of the track rod with respect to the wheel carrier exists due to the pivoting action of the point of pivotal connection provided at the cross bearer for the tie rod which pivots along independently of the respective base position. These measures result in a favorable effect on the track steering particularly in conjunction with the fact that the point of pivotal connection on the wheel-carrier side of the track rod, i.e., the point of pivotal connection thereof at the track link steering lever lies at the same height and in the same transverse plane together with the correspondingly extending guide member, which has as a consequence that, presupposing a track-constant guidance of the wheel, the point of pivotal connection of the track rod at the track link steering arm during the spring movements of the wheels describes out of a base position, respectively an essentially regularly arcuate path disposed essentially also in one plane.

With a view toward maintaining constant the track, particularly favorable values can be achieved with a track steering of the aforementioned type in that the point of pivotal connection on the frame-side of the track rod in a base position for oppositely directed spring movements, especially in the normal base position, lies on a straight line, to be referred to hereinafter as the ideal straight line which, in relation to the straight driving position of the wheel, is disposed perpendicularly to a plane which, starting from the base position, is defined by the point of pivotal connection of the track rod at the track link steering arm in its positions corresponding to different spring deflection positions of the wheel during oppositely directed spring movements and with an unchanged track, and extends through this plane in the center point of the curved arc which is described by the point of pivotal connection of the track rod at the track link steering arm during spring movements of the wheel carried out with an unchanged track.

The described position of the point of pivotal connection of the track rod on the frame-side has proved as the optimum position but cannot be realized always for constructive reasons. In such a case it is appropriate to so locate the point of pivotal connection of the track rod on the frame-side that it comes to lie in the plane defined by the ideal straight line and the point of pivotal connection of the track rod at the track link steering lever.

The point of the ideal straight line which as a rule represents the most favorable position for the point of pivotal connection of the track rod on the frame-side is characterized in that it lies in the plane defined by the point of pivotal connection of the track rod at the track link steering lever in its positions corresponding to the different spring deflection positions of the wheel from its basic position with unchanged track.

With a track steering according to the preesent invention which is advantageous in particular in conjunction with the double-guide axles of the type of the present invention, the track rod can be so located in adaptation to existing constructive conditions that the point of pivotal connection thereof at the track link steering arm lies, as viewed in plan view, at a larger distance from the vehicle longitudinal center than the corresponding point of pivotal connection of the associated guide member at the wheel carrier, i.e., also in such a manner that the point of pivotal connection between the track link steering lever and the track rod has, as viewed in plan view, a smaller distance with respect to the vehicle longitudinal center plane than the point of pivotal connection of the corresponding guide member at the wheel carrier. The arrangement and construction for the guide member and the track rod are thereby so constructed and selected that cross-overs do not result as viewed in plan view.

If a track steering according to the present invention is provided, then a lateral force under-control can be achieved in a simple manner within the scope of the present invention in that the respective inner point of pivotal connection on the frame-side, i.e., the point of pivotal connection adjacent the vehicle longitudinal center plane, of these guide members of the guide means which are coupled by a cross connection, is constituted by a soft bearing place whereas the respective outer point of pivotal connection on the frame-side, i.e., the point of pivotal connection which is disposed farther away from the vehicle center, as well as the respective corresponding point of pivotal connection on the frame-side of the track rod is constituted by a hard bearing place. Prerequisite for the fact that a lateral force under-control occurs with such a construction of the points of pivotal connection, is that the guide members coupled by the cross connection and the track rods are so arranged and dimensioned that, in relation to the respective curve-outer wheel, this wheel can pass over into toe-in under the influence of the lateral forces. The track link steering lever therefore has to be guided by way of the track rod and guide member in such a manner that with the described construction of the points of pivotal connection, it is displaced under the influence of the lateral force, as viewed in plan view, in the driving direction of the vehicle in its area near the wheel with respect to its area remote from the wheel or opposite the driving direction of the vehicle in its area remote from the wheel with respect to the area near the wheel.

With a view toward the aimed-at lateral force under-control, it is additionally appropriate within the scope of the present invention to so select the points of pivotal connection of the upper and lower guide members at the wheel carrier that a straight line passing through these points of pivotal connection, as viewed in side view, extends through the floor plane in a point which, in relation to the driving direction, lies to the rear of the point of engagement of the lateral force so that a moment is produced by the lateral force which forces the wheel on the outside of the curve into toe-in and the wheel on the inside of the curve correspondingly into a toe-out.

It is possible to achieve for oppositely directed spring movements with track steering systems of the aforedescribed type according to the present invention, starting from a base position attained by unidirectional spring movements, an absolute track constancy for the oppositely directed spring movements out of this base position. In view of the oppositely directed spring movements out of other base positions, the aimed-at track constancy during oppositely directed spring movements is attainable, in contrast thereto, by the described means only in approximation, even though with a good approximation. This is due to the fact that the pivotal movement of the points of pivotal connection disposed at the cross connection for the track rod which is attained for alterate spring movements during the rotation of the cross connection by reason of unidirectional spring movement into the respective base position, is not always so large that the point of pivotal connection lies again on the ideal straight line given for the respective base position.

In order to exclude this source of error, it is additionally proposed according to the present invention to provide for the guidance of the point of pivotal connection on the frame-side of a track rod, one transmission each which is adapted to be driven by way of the cross connection rotatable about its axis, especially by way of the cross bearer rotatable about its axis, and which includes a lever carrying the point of pivotal connection of the track rod on the frame-side. For such a transmission, it is appropriate within the scope of the present invention if the lever carrying the point of pivotal connection of the track rod on the frame-side has an axis of rotation parallel to the axis of rotation of the cross connection and if the lever is arranged on a shaft which is connected with the cross connection, especially with the cross bearer by way of a lever ratio.

Accordingly, it is an object of the present invention to provide a wheel suspension which avoids by simple means the aforementioned shortcomings and drawbacks encountered in the prior art.

Another object of the present invention resides in a wheel suspension for the wheels of motor vehicles, especially passenger motor vehicles, which is simple in construction yet extremely accurate in the guidance of the wheels.

A further object of the present invention resides in a wheel suspension of the type described above which assures an accurate guidance of the wheels together with a compact, space-saving construction.

Still another object of the present invention resides in a wheel suspension which not only assures a precise and kinematically accurate wheel guidance but additionally an at least nearly constant wheel camber and constant track width in case of unidirectional as well as oppositely directed spring deflections of the mutually oppositely disposed wheels of a respective axle.

A further object of the present invention resides in a wheel suspension which permits a complete compensation or even overcompensation of the starting and brake nose-diving of the vehicle while enabling at the same time relatively small unsprung masses and an accurate track steering.

These and further objects, features and advantages of the present invention will become more apparent from the following description when taken in connection with the accompanying drawing which shows, for purposes of illustration only, several embodiments in accordance with the present invention, and wherein:

FIG. 11 is a partial plan view of a still further embodiment of a wheel suspension according to the present invention for use with a front axle having steered and non-driven wheels;

FIG. 12 is a partial rear elevational view of the wheel suspension illustrated in FIG. 11;

FIG. 13 is a partial side elevational view of the wheel suspension according to FIGS. 11 and 12;

Figure 1:
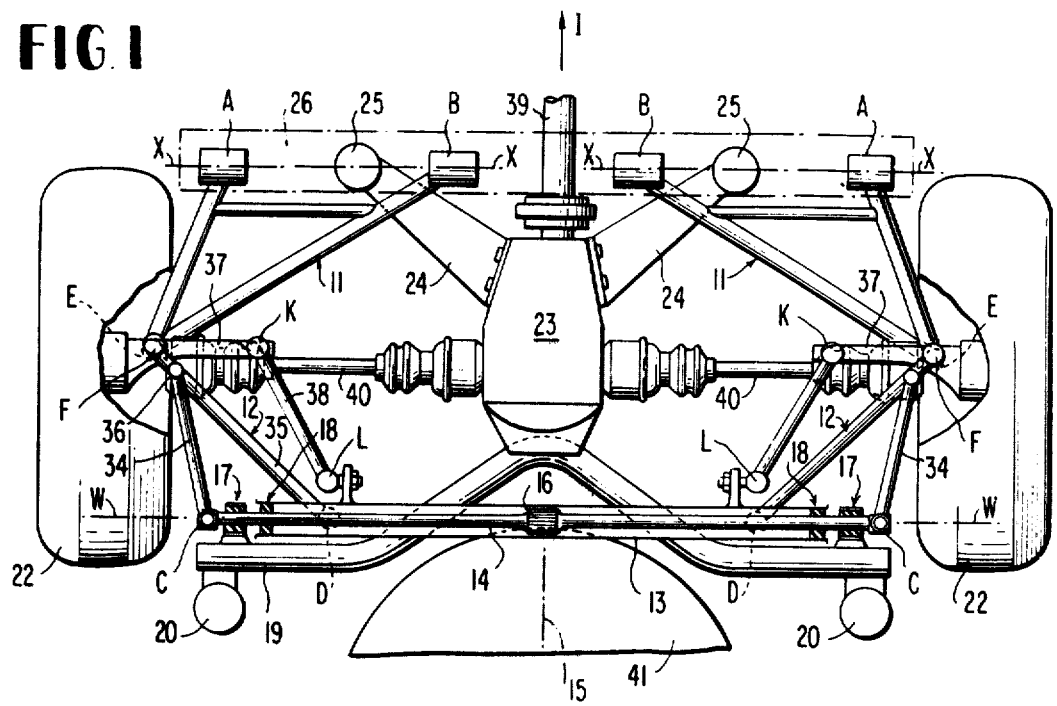
FIG. 1 is a somewhat schematic plan view of one embodiment of a wheel suspension according to the present invention for driven rear axle.
Figure 2:
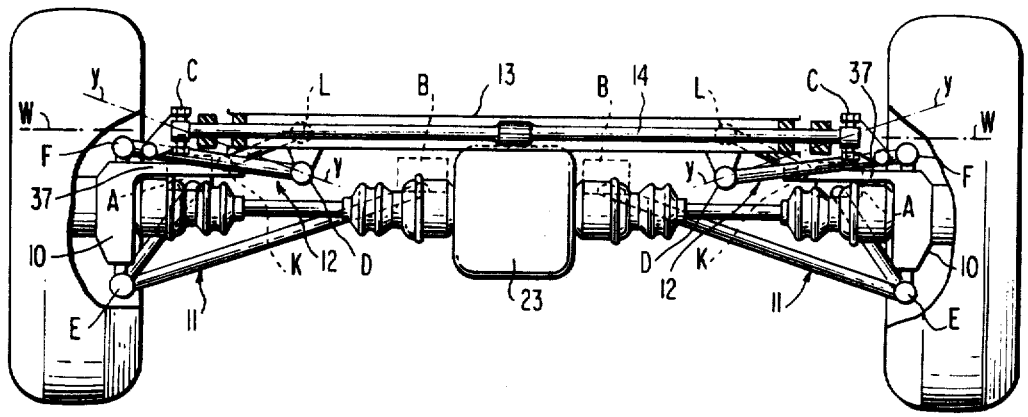
FIG. 2 is a rear elevational view of the wheel suspension of FIG. 1, whereby the auxiliary bearer, visible in FIG. 1, has been omitted for the sake of simplicity.
Figure 3:
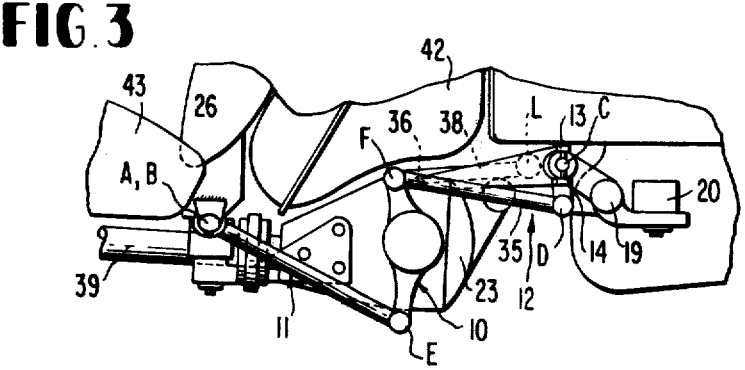
FIG. 3 is a partial side elevational view of the wheel suspension according to FIGS. 1 and 2 whereby the wheels have been omitted for the sake of clarity.
Figure 15:
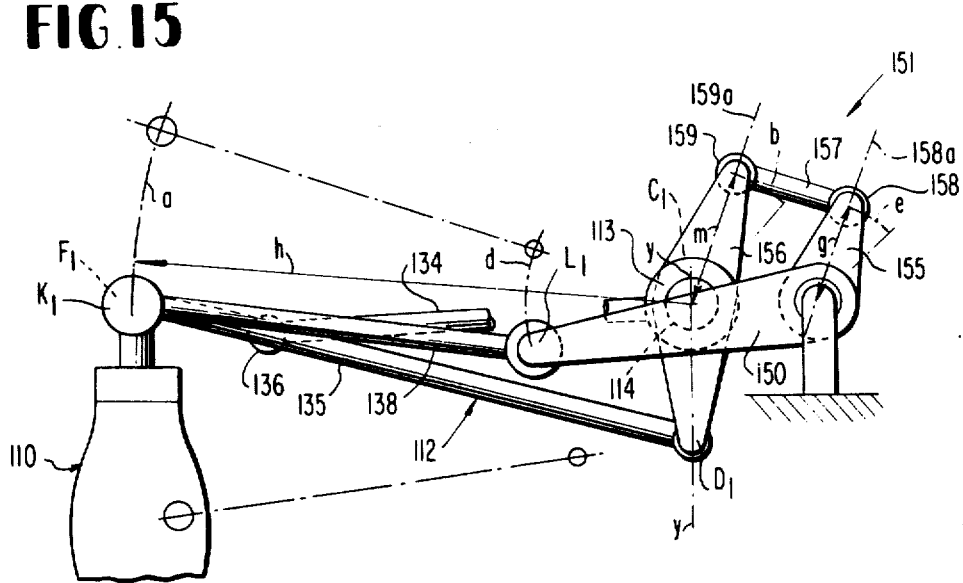
Figure 14:
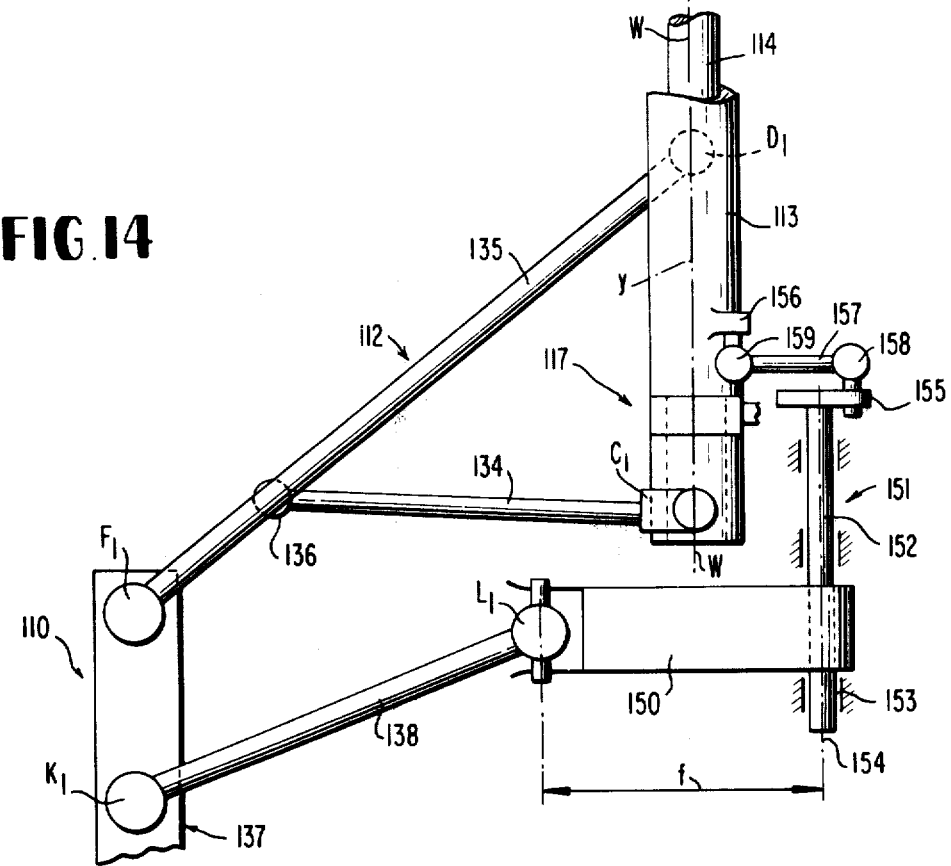

FIG. 14 is a partial somewhat schematic plan view of a wheel suspension according to the present invention having a construction similar to FIGS. 1 to 3 in which, the deviation from the embodiment of FIGS. 1 to 3, the track rod is displaced toward the outside with respect to the guide member and in which additionally a steering gear is provided, from which is controlled a lever which carries the point of pivotal connection of the track rod on the frame-side in dependence on the rotary movement of the cross bearer about its axis; and FIG. 15 is a partial schematic side elevational view of the wheel suspension according to FIG. 14, whereby differing spring positions are illustrated in dash and dot lines.

Referring now to the drawing wherein like reference numerals are used throughout the various views to designate like parts, the wheel suspensions according to the present invention illustrated in the various figures are constructed in the manner of so-called double guide axles and correspondingly upper and lower guide means are provided in the embodiment according to FIGS. 1 to 3 for the wheel carriers 10 guided as coupler, of which one each belongs to a respective axle side. The lower and forward guide means, i.e., forward in the illustrated embodiment in relation to the driving direction I (FIG. 1) of the vehicle (not illustrated) provided with such a wheel suspension for at least one of its axles, are each constituted by a guide member generally designated by reference numeral 11 which is constructed as triangular guide member and includes points of pivotal connection A and B on the frame-side as well as a point of pivotal connection E on the wheel-carrier side. The upper and rearward guide means, i.e., rearward in the illustrated embodiment in relation to the driving direction I, include again guide members generally designated by reference numeral 12 and constructed as triangular guide members and additionally a cross connection coupling these guide members 12. In the illustrated embodiment a cross bearer 13 constituted by a hollow cylinder, especially a tubular member, and a torsion rod 14 arranged within the cross bearer 13 and projecting beyond the cross bearer on both ends which serves as stabilizer form part of this cross connection. The torsion rod 14 is non-rotatably fixed with respect to the cross bearer 13 centrally thereof, i.e., within the area of the vertical vehicle longitudinal center plane 15, indicated in FIG. 1 in dash and dot lines, whereby the fixing is achieved in the illustrated embodiment by a serration 16 or similar splined connection.

The points of pivotal connection C and D of the guide members 12 on the frame-side are provided at the cross connection constituted by the cross bearer 13 and the torsion rod 14. The mounting takes place in the illustrated embodiment in particular in such a manner that the outer point of pivotal connection C of a guide member 12 on the frame-side, which is located farther removed from the vehicle longitudinal center plane 15, is provided respectively at the torsion rod 14 and in that the respective inner point of pivotal connection D which is disposed nearer the vehicle longitudinal center plane 15 is arranged at the cross bearer 13. The points of pivotal connection C and D determine each the axis of rotation of the guide member 12 which is designated by y—y (FIG. 2).

The cross connection, consisting of cross bearer 13 and torsion rod 14, is rotatable as a unit about a horizontal axis of rotation w—w (FIGS. 1 and 2) extending in the vehicle transverse direction, which is achieved by a corresponding construction of the bearing supports 17, by way of which the cross connection is supported as a unit with respect to the vehicle frame which is not illustrated in detail herein and may be of any conventional construction. The bearing supports 17 are provided in the illustrated embodiment adjacent the points of pivotal connection C and guide the ends of the torsion rod 14 disposed on the outside of the cross bearer 13. The torsion rod 14, which is non-rotatably fixed centrally thereof with respect to the cross bearer 13 may be additionally supported with respect to the cross bearer 13 within the area of the ends thereof, as generally indicated in the illustrated embodiment by reference numeral 18. Bearing supports or the like may serve for the purpose of such support.

The bearing supports 17 are not arranged directly at the vehicle frame in the illustrated embodiment but instead are arranged at an auxiliary bearer 19 which, in its turn, is supported with respect to the vehicle frame (not shown) by way of mounting supports 20. In the illustrated embodiment the auxiliary bearer 19 is cranked within its central area forwardly in relation to the driving direction I and is connected with the differential gear 23 provided in the drive connection for the driven wheels 22 guided by way of the wheel carriers 10. Arms 24 are also connected at the differential gear 23 which, in relation to the driving direction, each extend obliquely forwardly and outwardly and which are to be supported at their free ends with respect to the vehicle frame by way of mounting supports 25. More specifically, in the illustrated embodiment this support takes place with respect to a cross bearer 26 which is fixed with respect to the frame or may be incorporated in the frame and on which may also be secured the bearing supports forming the points of pivotal connection A, B of the lower forward guide means on the frame-side.

The mounting supports 20 and 25 are constituted in the embodiment of FIGS. 1 to 3 by elastic elements which in particular have a certain yieldingness in the vehicle longitudinal direction in the support with respect to the frame, whence the driving comfort is improved.

As already pointed out hereinabove, the outer point of pivotal connection C of the guide means 12 on the frame-side is provided in the instant embodiment respectively at the torsion rod 14. This requires a construction of the joint forming the point of pivotal connection C in such a manner that the latter is rigid with respect to the axis of rotation of the torsion rod 14 coinciding with the axis of rotation w—w of the cross connection. A possible type of construction of such a joint which is not rotatable with respect to an axis coinciding with the axis of rotation w—w is illustrated in FIGS. 4 and 5.

Figure 4:
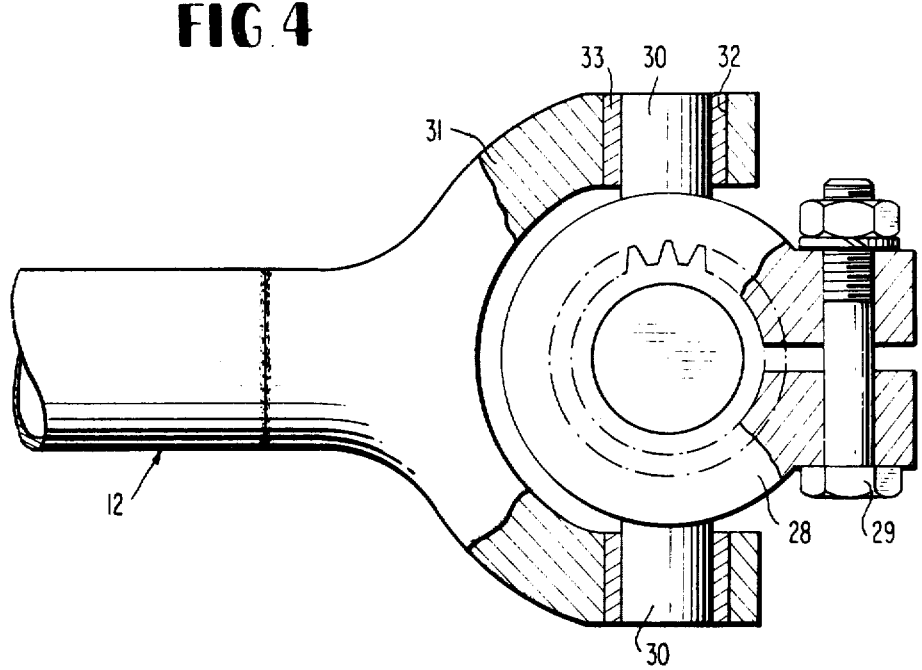
FIG. 4 is a partial cross-sectional view taken along line IV—IV of FIG. 5 of a swivel connection according to the present invention as is used in a wheel suspension according to FIGS. 1 to 3.
Figure 5:
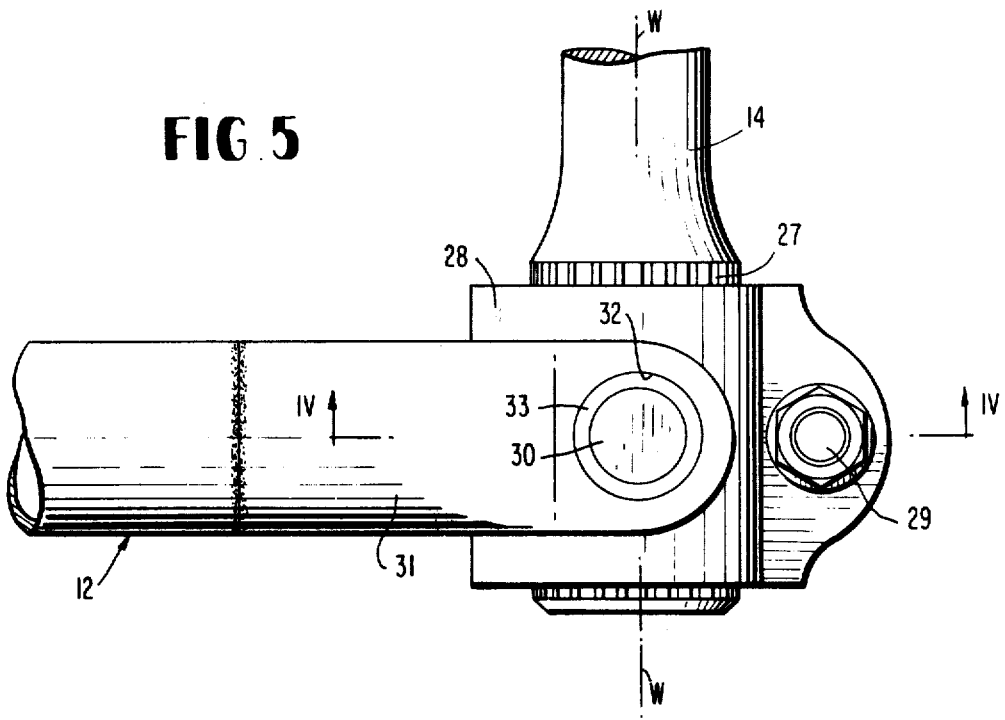
FIG. 5 is a partial plan view on the swivel connection according to FIG. 4.

In FIGS. 4 and 5, a serration 27 is provided at the free end of the torsion rod 14 of which only the free end area is shown; a bush 28 provided with a corresponding serration is mounted over the serration 27. A non-rotatable connection results therefrom with respect to the axis of rotation w—w. The bush 28 may be constructed, as illustrated in FIGS. 4 and 5 in the manner of a clamping collar and may be tightened within the area of its separation by way of a clamping bolt 29. Of course, also undivided bushes may be used for the indicated purpose. Pins 30 are arranged externally at the bush 28 on mutually opposite sides and aligned with respect to one another, which serve as bearing pins. The fork-shaped end portion 31 of the part of a guide member 12 belonging to the point of the pivotal connection C is pivotally supported by the pins 30. The fork-shaped end portion 31 is provided for that purpose with bores 32 and with bearings inserted into these bores, in the illustrated embodiment with bearing sleeves 33. The bearing pins 30 extend perpendicularly to the axis of rotation w—w and enable accordingly a pivoting with respect to an axis perpendicular to the axis of rotation w—w.

In the illustrated embodiment of the guide member 12 constructed as triangular guide member, the guide members include each two arms 34, 35 (FIG. 1), of which the arm 34 extends to the point of pivotal connection C and the arm 35 to the point of pivotal connection D. The arms 34 and 35 are connected with each other in a point 36 whereby this connection is constructed in the illustrated embodiment joint-like in order to preclude a stressing and twisting in the position of the axis of rotation y—y of the guide member 12 deviating from the axis of rotation w—w and with a rotation of the guide member 12 about its axis of rotation y—y and thus to assure a free pivotability. As can be seen in particular from the rear view according to FIG. 2 and the side view according to FIG. 3, the axes of rotation y—y of the rear and upper guide members 12 of the illustrated embodiments are located essentially in a vehicle cross plane and extend obliquely downwardly toward the vehicle longitudinal center plane 15. The axes of rotation x—x of the forward and lower guide members 11, in contrast thereto, are disposed coaxially aligned to one another in the illustrated embodiment according to the present invention and are disposed parallel to the axis of rotation w—w, i.e., essentially horizontally and perpendicularly to the vehicle longitudinal center plane 15. This location of the axes of rotation of the guide members and of the cross bearer, in conjunction with the pivotal connection of the rear upper guide members 12 at the cross bearer 13 and of the coupling of the guide members 12 by way of the cross connection, has as a consequence different ways of operation of the wheel suspension according to the present invention during unidirectional and oppositely directed spring movements.

During both types of spring movements, i.e., during unidirectional and oppositely directed spring movements, the lower guide members 11 rotate about their horizontal axes of rotation x—x disposed transversely to the driving direction and thus guide the wheel carriers 10 in the respective points of connection E thereof by means of the latter in vertical planes extending in the vehicle longitudinal direction. The upper guide members 12 of the illustrated embodiment, in contradistinction thereto, rotate about different axes of rotation during unidirectional and oppositely directed spring movements. This is conditioned by the cross connection, with which the guide members 12 form a common unit pivotal about the axis of rotation w—w during unidirectional spring movements. The common pivoting movements of the guide members 12 together with the cross connection about the axis of rotation w—w thereof results during unidirectional spring movements from the fact that the arms 34 of the guide members 12 are non-rotatably connected with the torsion rod 14 non-rotatable in relation to the axis of rotation w—w in the joints forming the points of pivotal connection C, while the torsion rod in its turn, is non-rotatably coupled to the cross bearer 13 by means of the serrations 16, and the respective inner second point of pivotal connection D of the guide members 12 on the frame-side is provided at the cross bearer 13.

The upper guide means of the illustrated embodiment which include the guide members 12 and the cross connection, consisting of cross bearer 13 and stabilizer 14 as torsion element, form therefore a nearly rigid unit for the unidirectional spring movement which can rotate only about the axis w—w which has as a consequence that during unidirectional spring movements also the points of pivotal connection F of the guide members 12 at the wheel carriers 10 move in vertical planes extending in the vehicle longitudinal direction. Accordingly, for the unidirectional spring movement, a motion development results which corresponds to that of a double longitudinal guide axle and no changes in camber and track width occur.

Different movement conditions result for the oppositely directed spring movement with respect to the rear upper guide means 12 of the illustrated embodiment. For purposes of analysis thereof, one has to start with the fact that during oppositely directed spring movements, the mutually corresponding points of pivotal connection F of the guide members 12 at the wheel carriers 10 move in opposite directions in the vertical direction, and more particularly in such a manner that one point of pivotal connection F, for example, the left point of pivotal connection F in the illustrated embodiment is raised by the same amount by which the other, i.e., the right point of pivotal connection F is lowered. This alternate oppositely directed movement of the wheel carriers 10 brings about that in the construcion according to the present invention the respective associated halves of the torsion rod 14 are torsionally stressed in opposite directions and as a result thereof the area of the torsion rod 14 disposed in the longitudinal center remains in its normal starting position whereby also the cross bearer 13 is retained in its starting position. The guide members 12 therefore have to rotate about their axes y—y which drop off toward the vehicle longitudinal center plane 15 and which are determined by the points of pivotal connection D provided at the cross bearer 13 and the points of pivotal connection C provided at the torsion rod 14.

During the described course of movement, during which one has started with an inward spring movement of the left axle side, i.e., an upward movement of the left axle side, the point of pivotal connection F associated with this axle side is guided during such spring movement toward the vehicle longitudinal center plane 15 whereas the point of pivotal connection associated with the right axle side undergoing a downward spring deflection is guided outwardly away from the vehicle longitudinal center plane 15. This guidance of the points of pivotal connection F has as a consequence in conjunction with the guidance of the points of pivotal connection E in vertical planes extending in the vehicle longitudinal direction, which is identical during both unidirectional and oppositely directed spring movements, that of the two wheels 22 the left inwardly upwardly spring-deflected wheel receives a negative camber with respect to the vehicle body and the right downwardly spring-deflecting wheel receives a positive camber with respect to the vehicle body.

By a corresponding inclination of the axis of rotation y—y of the guide members 12 with respect to the vehicle longitudinal center plane 15, it is now possible according to the present invention to establish for the oppositely directed spring movements a desired camber which is constant for the wheels with respect to the road surface. Consequently, the camber with respect to the rod surface can be made equal to zero during oppositely directed spring movements or can even be adjusted so as to be negative without causing a change of the camber, for example, of the camber zero with respect to the road surface during unidirectional spring movements because during unidirectional spring movements, changes in camber do not occur, as pointed out above.

The wheel suspension according to the present invention, described with respect to FIGS. 1 to 3 thus enables to maintain constant the camber with respect to the road plane and the wheel track for unidirectional and oppositely directed spring movements. Therebeyond, favorable values also result within the frame of the present invention for a one-sided spring deflection.

This is due to the fact that during one-sided spring deflections which are each composed to one-half of unidirectional and to one-half of oppositely directed spring movements, a camber value results which corresponds to the average value of the camber produced during unidirectional spring movements (for example, camber zero) and of the camber which establishes itself during oppositely directed spring movements with respect to the vehicle body.

As can be seen from FIGS. 1 to 3, and more particularly from FIGS. 1 and 2, one track link steering arm or lever 37 each is fixedly mounted at the respective wheel carrier 10 guided by the guide members 11 and 12 in the points of pivotal connection E and F; in the illustrated embodiment, the track link steering lever 37 forms a component part of the wheel carrier 10. The track link steering arm 37 extends in the vehicle transverse direction and is so arranged and constructed that its point of pivotal connection K between the track link steering arm 37 and a tie-rod or track rod 38 is located at the same height as the point of pivotal connection F of the upper guide member 12 at the wheel carrier 10. Additionally, the points of pivotal connection K and F also lie in a common vehicle cross plane. This location of the point of pivotal connection K of the track rod 38 at the track link steering arm 37 has as a consequence that—assuming initially no pivotal connection of the track rod on the frame-side—the points of pivotal connection K and F move along essentially similar, planar curved arcs during the spring movements of the wheel with the track kept constant whereby the term track is understood to refer to herein both to toe-in or toe-out. Also the point of pivotal connection K for the track rod 38 therefore describes with this arrangement an essentially planar curved path during spring movements and it is possible as a result thereof to so locate the point of pivotal connection L on the frame-side for the track rod that, initially referred to only to the normal base position illustrated in the drawing, the wheel carrier 10 and the wheel 22 are so steered by way of the track rod 38 that no track changes occur during spring movements.

According to the present invention, this is achieved in conjunction with the specific location of the point of pivotal connection K of the track rod 38 at the track link steering lever 37 in that the point of pivotal connection L of the track rod 38 on the frame-side is located on a straight line (not shown), the so-called ideal straight line, which is perpendicular to that plane, in which is at least substantially located the motion curve described by the point of povital connection K during the spring movements of the wheel, and which extends through this plane in the center point of the at least approximately regularly curved motion curve.

The thus obtained spatial location for the point of pivotal connection L of the track rod 38 is different for each of the base positions that is attainable by unidirectional spring movements, and this fact is taken into consideration in the construction according to the present invention in that the point of pivotal connection L of the track rod 38 is provided at the cross bearer 13. As a result thereof, the point of pivotal connection L is pivoted along in each case during unidirectional spring movements which have as a consequence a rotation of the cross bearer 13 about its axis of rotation w—w, and it thus receives also for the base positions deviating from the normal base position which is illustrated in the various figures, a position which corresponds in approximation to the position described hereinabove for the normal base position so that the selected track, by which is again to be understood both toe-in or toe-out, remains preserved in approximation for all positions of oppositely directed spring movements.

During unidirectional spring movements the track remains constant in the selected wheel suspension as described hereinabove because the guide members 12 coupled by way of the cross connection and the track rod 38 pivotally connected at the cross bearer 13 rotate in unison about the horizontally disposed axis of rotation w—w of the cross connection and therewith also of the cross bearer 13 and as a result thereof behave as longitudinal guide members like the guide members 11 in the described embodiment. In particular when wheel suspensions of the aforementioned type exhibit stronger positive casters during spring deflections, it is a prerequisite therefor also that the point of pivotal connection K of the track rod 38 at the track link steering lever 37 lies at the same height as the point of pivotal connection of the guide member at the wheel carrier which extends in the same direction as the track rod 38. In the illustrated embodiments, these are, as already explained, the respective guide member 12 and the point of pivotal connection F thereof on the wheel-carrier side.

The wheel suspension described by reference to the embodiment according to FIGS. 1 to 3 enables, as can be readily seen from the figures, a very space-saving overall arrangement notwithstanding its many advantages, in which additionally, neither the accommodation of the differential gear 23 nor the arrangement of the cardan shaft 39 leading to the differential gear 23 and of the axle shafts 40 leading from the differential gear 23 to the wheels offer any difficulties. The very flat construction of the wheel suspension is poossible in particular by the fact that the axes of rotation x—x of the forward lower guide members are located, in relation to the normal base position, approximately at the height of the wheel centers and that the axis of rotation w—w of the cross connection is provided approximately at the height of the point of pivotal connection F of the upper guide members 12 at the wheel carriers 10 so that any parts projecting upwardly are completely missing. A favorable space utilization in the vehicle body is thereby greatly facilitated. In particular, FIGS. 1 and 3 clearly indicate this fact, and more particularly by the possible favorable arrangement of a recess 41 (FIG. 1) for a spare wheel and the protected arrangement of the tank 42 (FIG. 3) above the axle. By reason of the possibility to arrange the spare wheel recessed and drawn relatively far toward the vehicle cross plane containing the wheel centers, a large-surfaced and deep luggage space with a flat floor area can be realized notwithstanding a relatively slight rear vehicle overhang. It can be further readily recognized from FIG. 3 that the arrangement of the seats 43 indicated only schematically is not impaired by the points of pivotal connection A and B of the lower and forward guide members 11 on the frame-side even though these points of pivotal connection A and B are so located as is appropriate with a view toward achieving the starting and braking nose-diving compensation.

As described hereinabove, even though the aimed-at track constancy for the unidirectional spring movements and for the oppositely directed spring movements out of the normal base position can be achieved by a track steering system as has been described by reference to FIGS. 1 and 3 and as is achieved by the arrangement according to the present invention of the track rod 38 and of the track link steering arm 37, nevertheless certain, even though relatively small track changes cannot be avoided with the described arrangement for oppositely directed spring movements out of base positions deviating from the normal base position which are reached by unidirectional spring movements. These small track changes are conditioned by the fact that with a rotation of the cross bearer 13 about its axis of rotation w—w conditioned by unidirectional spring movements, the point of pivotal connection provided at the cross bearer is not pivoted in each case precisely into a position in which it lies on the ideal straight line for the new base position.

This has as a concrete result in embodiments which correspond to the embodiment according to FIGS. 1 to 3 and in which the point of pivotal connection K of the track rod 38 at the track link steering lever 37 is located nearer to the vehicle longitudinal center plane 15 than the point of pivotal connection F on the side of the wheel carrier, i.e., in which the track rod 38 is located nearer the vehicle longitudinal center plane 15 than the corresponding guide member 12, in that the point of pivotal connection L of the track rod 38 at the cross bearer 13 is pivoted along further than it should be in order to come to lie on the respective ideal straight line. Conversely, in connection with embodiments not illustrated herein in which the point of pivotal connection K of the track rod at the track link steering arm is located farther away from the vehicle longitudinal center plane 15 than the point of pivotal connection F on the wheel-carrier side of the corresponding guide member, the point of pivotal connection of the track rod at the cross bearer is not sufficiently pivoted along in order to come to lie respectively on the ideal straight line for the corresponding base position during unidirectional spring movements. These deviations and the steering effects conditioned thereby, even though relatively small, during oppositely directed spring movements from base positions deviating from the normal base position and attained by unidirectional spring movements, can be avoided by a transmission arrangement according to FIGS. 14 or 15 in which for purposes of steering the point of pivotal connection of the track rod provided at the cross bearer, a location of this point of pivotal connection can be assured which has as a consequence an at least nearly constant track or in relation to the normal base position, only symmetrical track changes and therewith precludes undesired steering effects.

The arrangement illustrated only partially in FIGS. 14 and 15 corresponds in its basic construction, apart from the presence of the linkage forming the transmission, to the construction according to FIGS. 1 to 3, however, in contrast to the embodiment according to FIGS. 1 to 3, the track rod is arranged at a greater distance to the vehicle longitudinal center plane than the coordinated guide member. Consequently, the point of pivotal connection of the track rod at the track link steering arm is located at a greater distance to the vehicle longitudinal center plane than the point of pivotal connection of the corresponding guide member at the wheel carrier. In order to render these differences readily recognizable in the drawing, corresponding parts are not designated by the same reference numerals as used in FIGS. 1 to 3 but instead only corresponding reference numerals of the 100 series are used.

In FIGS. 14 and 15, the wheel carrier is generally designated by reference numeral 110, the guide member by reference numeral 112, the cross bearer by reference numeral 113 and the torsion rod by reference numeral 114. Furthermore, the bearing support, by way of which the cross connection is mounted at the auxiliary bearer (not shown) on the corresponding side, is generally designated by reference numeral 117. The points of pivotal connection on the frame-side and wheel-carrier side for the guide member 112 and the track rod 138 are designated by reference characters $C_1$, $D_1$, $F_1$, $K_1$ and $L_1$, by reference to similar reference characters also used for similar parts in FIGS. 1 to 3, whereby the point of pivotal connection $L_1$ on the frame-side of the track rod 138 is now no longer mounted directly at the cross bearer 113 but is connected with the same by way of the lever 150 and the transmission generally designated by reference numeral 151. The track link steering arm again made in one piece with the wheel carrier 110 is generally designated by reference numeral 137. The joint connection forming the point of pivotal connection $C_1$ is constructed corresponding to that illustrated and described by reference to FIGS. 4 and 5 and therefore will not be described in detail herein. Furthermore, the joint connecting with each other the two arms 134 and 135 is designated by reference numeral 136 in the embodiment according to FIGS. 14 and 15.

Furthermore, also in the embodiment according to FIGS. 14 and 15, the point of pivotal connection $F_1$ provided at the wheel carrier 110 for the guide member 112 is located at the same height as and in a common vehicle transverse plane with the point of pivotal connection $K_1$ of the track rod 138 at the track link steering lever 137. Finally, the axis of rotation of the cross connection is designated in this embodiment by w—w (FIG. 14) and the axis of rotation of the guide member 112 which is determined by the points of pivotal connection $C_1$ and $D_1$ on the frame-side, is designated by y—y (FIG. 15).

The lever 150 carrying the point of pivotal connection $L_1$ of the track rod 138 on the frame-side, which is drivingly connected with the cross bearer 113 by way of the transmission linkage 151, is non-rotatably arranged on a shaft 152 which is supported fixed with respect to the frame in bearing places 153 and whose axis of rotation 154 extends parallel to the axis of rotation w—w of the cross bearer 113. In the illustrated embodiment, the axis of rotation w—w and the axis of rotation 154 of the shaft 153 are located additionally in a common horizontal plane. A rocker arm 155 is non-rotatably mounted at the shaft 153, which together with a rocker arm 156 provided at the cross bearer 113 as well as with a coupler 157 connecting the two rocker arms forms a quadrillateral joined link system. The points of pivotal connection of the coupler 157 at the rocker arms 55 and 156 are designated by reference numerals 158 and 159. The arrangement of the rocker arms 155 and 156 in relation to one another is made in such a manner that within the scope of the pivot range in question in this embodiment, at least approximately identical pivot paths result for the points of pivotal connection 158 and 159 of the coupler 157 at the rocker arms 155 and 156 during rotation of the cross bearer 113. With reference to the normal base position, an approximately parallel extension of the straight lines, designated by reference numeral 158a and 159a, extending respectively from the points of pivotal connection 158, 159 through the associated axis of rotation of the rocker arms exists.

In connection with the design of the transmission, one starts with a track rod length determined for a preselected base position, preferably from the aforementioned normal base position, which corresponds to the distance between the points of pivotal connection $K_1$ and $L_1$ with the location of the point of pivotal connection $L_1$ on the ideal straight line given for this base position. Since the track rod length determined for the selected base position does not coincide with the track rod lengths which result for other base positions with a corresponding determination, the point of pivotal connection $L_1$ of the track rod determined in its length for the selected base position and thus fixed in relation to its length has to be so guided for other base positions that in these other base positions it lies in each case in the plane determined by the associated ideal straight line and the correspondingly located point of pivotal connection $K_1$ of the track rod at the track link steering arm. More particularly also in this case the posed task to avoid at least steering effects also in case of oppositely directed spring movements, is then solved. Consequently, it is necessary to guide the point of pivotal connection $L_1$ by way of the lever 150 of the transmission 151 in dependence on the respective rotational position of the cross bearer 113 in such a manner that the point of pivotal connection $L_1$ for each of the base positions deviating from the selected base position and attained by unidirectional spring movements lies in the corresponding plane (ideal plane) determined by the ideal straight line and the point of pivotal connection $K_1$ (desired-position of the point of pivotal connection $L_1$).

In that connection, at first the axis of rotation 154 of the guide member 150 has to be determined which in a projection on a vertical plane perpendicular to the axis of rotation w—w of the cross bearer is represented as center point of a desired curve which is defined by the point of pivotal connection $L_1$ of the track rod 138, fixed in its length, in the different base positions with unchanged track. The individual curve points of the desired curve result geometrically as points of intersection of a straight line with a circular arc whereby the straight line is formed by the intersection of the ideal line given in the respective base position with a vertical plane containing the desired curve and disposed perpendicularly to the axis of rotation w—w of the cross bearer 113 while the circular arc is described about the point of pivotal connection $K_1$, projected into the vertical plane containing the desired curve, with the length, also projected into this plane, of the track rod determined in its length for the selected base position as radius. If one now designates with $a$ the pivot path of the point of pivotal connection $K_1$ of the track rod 138 at the track link steering lever 137 between two base positions, $d$ the pivot path of the point of pivotal connection $L_1$ of the track rod 138 at the lever 150 between the same base positions, $f$ the length of the lever 150 non-rotatably connected with the shaft 152, $g$ the length of the rocker arm 155 non-rotatably connected with the shaft 152, $h$ the pivot radius for the point of pivotal connection $K_1$ of the track rod 138 at the track link steering lever 137 during unidirectional spring movements, and $m$ the length of the rocker arm 156 non-rotatably connected with the cross bearer 113, then under the assumption that the points of pivotal connection 158 and 159 of the coupler 157 at the rocker arms 155 and 156 carry out at least approximately identically large pivot paths during the rotation of the cross bearer 113, the transmission ratio of the transmission at which the point of pivotal connection $L_1$ of the track rod 138 at the lever 150 is so guided that during unidirectional spring movements no track change occurs, whereby this term track refers to either toe-in or toe-out, is determined according to the formula:

$$g = m \cdot \frac{a}{h} \cdot \frac{f}{d}$$

More particularly, if one designates, as illustrated in FIG. 15, the pivot path of the rocker arm 156 by $b$ and the pivot path of the rocker arm 155 by $e$, then under the assumption of at least approximately equally large pivot paths, i.e., under the assumption of $b = e$, the following equations are valid for the points of pivotal connection 158 and 159 of the coupler 157 at the rocker arms 155 and 156 during rotation of the cross bearer 113

$$b = m \cdot \frac{a}{h}, \text{ and}$$

$$e = g \cdot \frac{d}{f}$$

During oppositely directed spring movements from all possible base positions attained by unidirectional spring movements, track changes occur, but exclusively symmetrical track changes and therefor not connected with any steering effects because the point of pivotal connection $L_1$ on the frame-side of the track rod has been brought into the ideal plane associated with the respective base position by the transmission 151.

Figure 6:
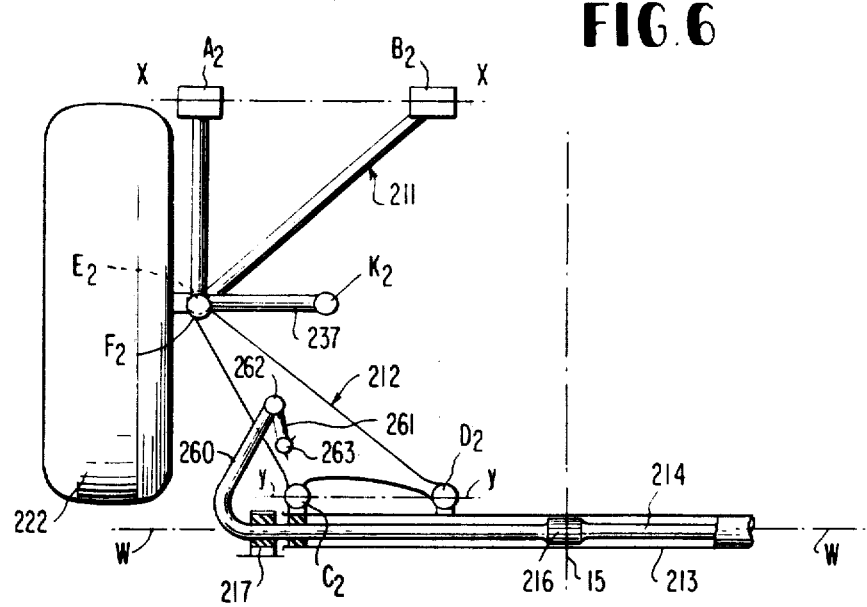
FIG. 6 is a partial plan view of a simplified schematic representation of a further embodiment of a wheel suspension according to the present invention suitable in particular for rear axles.
Figure 7:
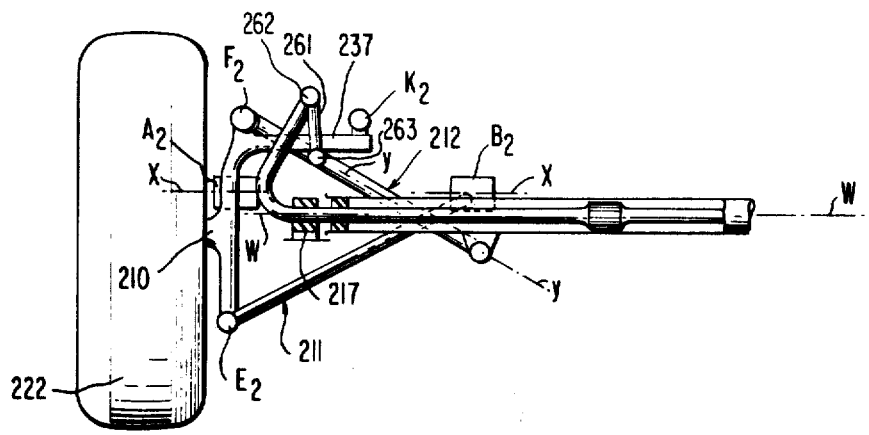
FIG. 7 is a partial rear elevational view of the wheel suspension according to FIG. 6.

A suspension is illustrated in FIGS. 6 and 7 which differs from the embodiment according to FIGS. 1 to 3 essentially in that both points of pivotal connection $C_2$ and $D_2$ on the frame-side of the upper and rear guide members 212 are provided respectively at the cross bearer 213 belonging to the cross connection. The second set of guide members is not illustrated in this embodiment since the illustration of the second axle half has been dispensed with by reason of the symmetrical construction of the axle symmetrical with respect to the vehicle longitudinal center plane 15. Furthermore, also the track steering system and the drive for the wheels are not shown in the embodiment according to FIGS. 6 and 7, and reference may be had with respect thereto as to what has been shown and described in connection with the embodiment of FIGS. 1 to 3.

The same is true with respect to the track steering system, of which only the track link steering lever designated by reference numeral 237 and associated with the wheel carrier 210 is illustrated, at which is arranged the point of pivotal connection $K_2$ for the track rod (not shown). The point of pivotal connection of the track rod on the frame-side is located, as in the embodiment according to FIGS. 1 to 3 at the cross bearer 213. By reason of the construction corresponding to the axle construction according to FIGS. 1 to 3 as regards the operation thereof, similar reference numerals of the 200 series are again used for corresponding individual parts.

The torsion rod 214 belonging to the cross connection is also arranged in this embodiment in the cross bearer 213 constructed as pipe and is non-rotatably connected with the cross bearer 213 within the area of the vehicle longitudinal center plane by way of the serrations 216. The cross bearer 213 and torsion rod 214 are rotatably supported in unison with respect to the frame (not shown) by way of bearing supports 217 whereby these bearing supports may be arranged at an auxiliary bearer (not shown), in adaptation to the disclosure of the construction of FIGS. 1 to 3.

The torsion rod 217 is provided in the embodiment of FIGS 6 and 7 with angularly bent end portions 260 which form connecting arms, by way of which the torsion rod 214 is connected with the guide members 212. Inherently rigid transmission elements 261, which in the illustrated embodiment are rod-shaped transmission elements 261, are provided in the connection of the end portions 260 acting as connecting arms with the guide members 212; the transmission elements 261 are pivotally connected with the end portion 260 and the guide member 212 in the points of pivotal connection 262 and 263. Of course, in lieu of a connecting arm formed in one piece with the torsion rod 214 and constituted by the end portion 260 thereof, also separate connecting arms may be provided which have to be non-rotatably connected with the torsion rod in relation to the axis of rotation w—w. The connection between the torsion rod and such connecting arms may take place by way of joints as are illustrated in the embodiment according to FIGS. 4 and 5.

Also in the embodiment according to FIGS. 6 and 7, the axes of rotation x—x of the forward and lower guide members 211, which are determined by the points of pivotal connection $A_2$ and $B_2$ on the frame-side, are again disposed aligned with one another and extend horizontally in the vehicle transverse plane. It is again true for the rear and upper guide members 212 that during unidirectional spring movements they are pivotal in unison with the cross connection about the axis of rotation w—w thereof whereas the respective axis of rotation thereof y—y for oppositely directed spring movements is determined by the points of pivotal connection thereof $C_2$ and $D_2$ on the frame-side which are arranged at the cross bearer 213. The axis of rotation y—y is again inclined obliquely downwardly toward the vehicle longitudinal center plane 15 as viewed in rear elevational view (FIG. 7). The points of pivotal connection of the guide members 211 and 212 at the wheel carrier 210 are designated by $F_2$ and $E_2$ and the same is true, in principle, with resect to the embodiment according to FIGS. 6 and 7 during unidirectional and oppositely directed spring movements of the wheel 222 as was indicated in connection with the embodiment of FIGS. 1 to 3.

Two embodiments of a wheel suspension according to the present invention for a front axle with steerable wheels is illustrated in FIGS. 8 to 10 and FIGS. 11 to 13. By reason of the symmetrical axle construction with respect to the longitudinal center plane, essentially only one axle half is illustrated in each case. The main difference between the two embodiments resides in the construction of the steering system, and the following description of these embodiments can therefore be limited essentially to those details since, apart from a position of the axis of rotation for the lower guide members deviating from the embodiment according to FIGS. 1 to 3, the construction and arrangement of the upper and lower guide means for the wheel carriers corresponds to what has already been described in detail in connection with the embodiment of FIGS. 1 to 3. Consequently, corresponding reference numerals of the 300 and 400 series are again used for the individual corresponding parts of the wheel suspensions according to FIGS. 8 to 10 and FIGS. 11 to 13.

Figure 9:
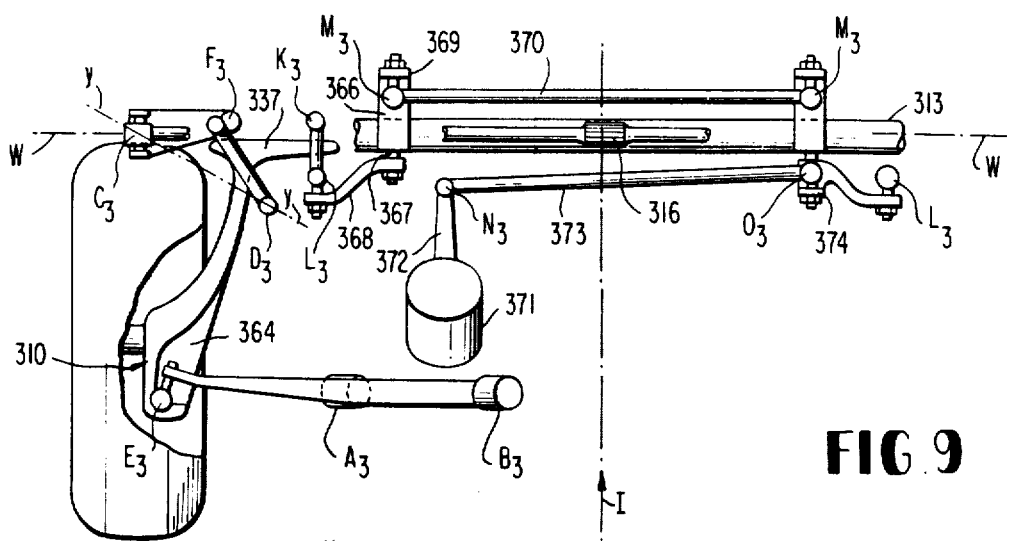
FIG. 9 is a partial rear elevational view of the wheel suspension for a front axle according to the present invention as illustrated in FIG. 8.
Figure 8:
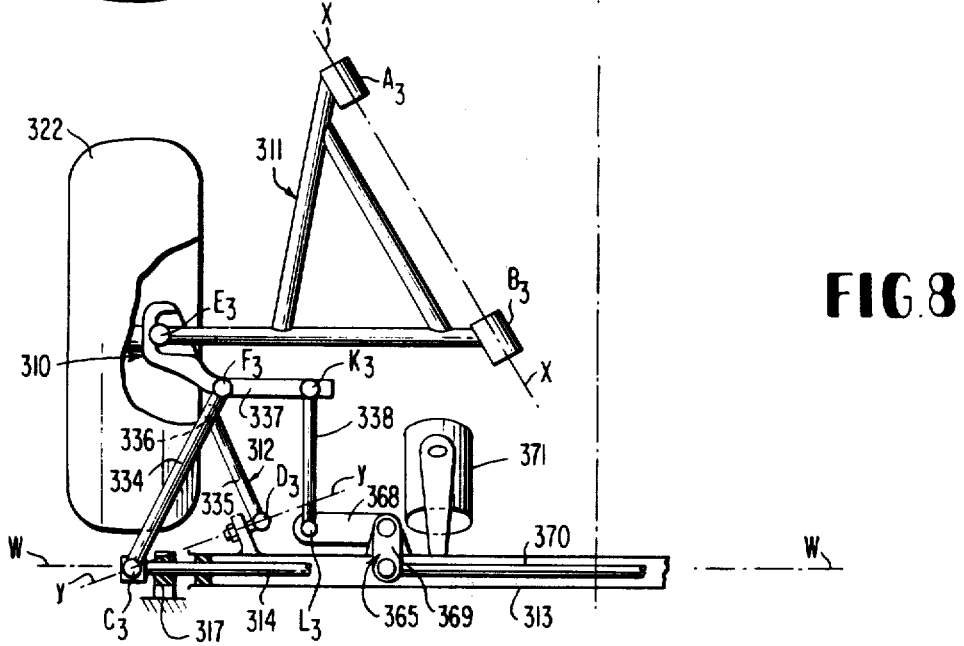
FIG. 8 is a partial plan view on a wheel suspension according to the present invention, and more particularly for use with a front axle having steered and non-driven wheels.
Figure 10:
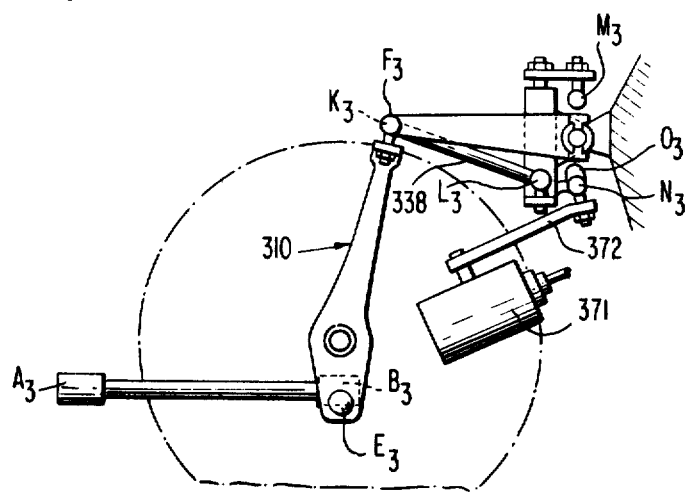
FIG. 10 is a partial side elevational view of the wheel suspension illustrated in FIGS. 8 and 9.

In the embodiment according to FIGS. 8 to 10, the wheel carrier is generally designated by reference numeral 310 which is pivotally connected with the upper and rear guide member generally designated by reference numeral 312 in the point of pivotal connection $F_3$ and which is connected in the point of pivotal connection $E_3$ with the lower and forward guide member generally designated by reference numeral 311. The point of pivotal connection $E_3$ is thereby located according to the present invention in a pocket 364 (FIG. 9) of the wheel carrier 310 which is open toward the vehicle center so that a small distance of this point of pivotal connection with respect to the plane of erection of the wheel results.

The forward and lower guide member 311 which is constructed as triangular guide member is fixed with respect to the vehicle frame (not shown) in the points of pivotal connection $A_3$ and $B_3$ which, in their turn, determine an axis of rotation x—x (FIG. 8) which extends in this embodiment obliquely forwardly and outwardly in relation to the driving direction I of the vehicle with an approximately horizontal position. In conjunction with the relatively large length of the guide member 311, possible with front axles, i.e., of the large distance between the axis of rotation x—x and the point of pivotal connection $E_3$, this location of the axis of rotation x—x leads to the fact that during spring deflections, the point of pivotal connection $E_3$ moves essentially vertically over a large range thereof.

The rear and upper guide member 312 which is connected with the wheel carrier 310 in the point of pivotal connection $F_3$, includes points of pivotal connection $C_3$ and $D_3$ on the frame-side, of which the point of pivotal connection $D_3$ is arranged at the cross bearer 313 whereas the point of pivotal connection $C_3$ is pivotally connected at the torsion rod 314, and more particularly in the illustrated embodiment by way of a swivel connection as corresponds to that illustrated in FIGS. 4 and 5. The torsion rod 314 which again extends through the cross bearer 313 constituted by a tubular member and which is again non-rotatably connected with the cross bearer 313 within the area of the vehicle longitudinal center plane by way of a serration 316 (FIG. 9), again has an axis of rotation w—w (FIGS. 8 and 9) in common with the cross bearer 313, on which is located the point of pivotal connection $C_3$. The torsion rod 314 and the cross bearer 313 which together form the cross connection are again supported with respect to the frame indicated only schematically by way of bearing supports 317 whereby the bearing supports are arranged either directly at the frame or may be mounted at an auxiliary bearer similar to the arrangement as shown in the embodiment according to FIGS. 1 to 3, though these variations are not illustrated herein in detail.

The guide member 312 non-rotatably connected with the torsion rod 314 in the point of pivotal connection $C_3$ and constructed as triangular guide member also includes in this embodiment two arms 334 and 335 (FIG. 8) which are pivotally connected with each other in the point of pivotal connection 336.

Corresponding to the embodiment according to FIGS. 1 to 3 the wheel suspensions which include guide members 312 coupled with each other by the cross connection again possess different axes of rotation for unidirectional and oppositely directed spring movements, and corresponding to the previous descriptions the upper and rear wheel guide means are pivotally arranged in unison about the axis of rotation w—w during unidirectional spring movements whereas during oppositely directed spring movements, the guide members 312 exclusively pivot about their axes of rotation y—y while a rotation or pivoting about the axis of rotation w—w does not take place.

A track link steering lever 337 (FIG. 8) is also provided in this embodiment at the wheel carrier 310 which extends in the vehicle transverse direction and on which is provided a point of pivotal connection $K_3$ for a track rod 338. The point of pivotal connection $K_3$ again lies at the same height as the point of pivotal connection of the rear and upper guide member at the wheel carrier 310 which is designated by $F_3$. Furthermore, the points of pivotal connection $F_3$ and $K_3$ are located in a vehicle transverse plane. The track rod 338 extends in the illustrated constructional position, in which the wheels 322 have a straight driving position, in the vehicle longitudinal direction and is respectively connected with an intermediate lever 365 at the point of pivotal connection $L_3$, whereby the point of pivotal connection $L_3$ again is preferably so located that it lies on the so-called ideal straight line, which, as described in detail with reference to FIGS. 1 to 3, leads to the fact that during the oppositely directed spring movements out of the normal base position, no track changes occur, and that also in other base positions attainable by unidirectional spring movements only relatively small track changes result for oppositely disposed spring movements which cause no steering effects. Track changes do not exist anyhow during exclusively unidirectional spring movements because in that case the upper guide members pivot together with the cross connection and with the track rod in unison about the axis of rotation w—w and thus behave altogether like a large longitudinal guide member.

The arrangement necessary therefor of the point of pivotal connection $L_3$ on the frame-side of the track rod at the cross bearer is achieved by way of the intermediate steering lever 365 which, in its turn, is arranged at the cross bearer 313. The intermediate steering lever 365 includes in the illustrated embodiment an uprigh bush 366 fixed with respect to the cross bearer 313 in which is guided a shaft or pin 367 which is connected at its upper and at its lower end with the arms 368 and 369. The arms 368 and 369 are disposed perpendicularly to one another in this embodiment and the arm 368 disposed below the cross bearer 313, as viewed in rear view according to FIG. 9, carries the point of pivotal connection $L_3$. The arm 369 of the intermediate steering lever 365 which is located above the cross bearer 313 as viewed in rear view according to FIG. 9, of which one each is provided on each axle side in asymmetrical arrangement with respect to the vehicle longitudinal center plane, includes a point of pivotal connection $M_3$ for an intermediate steering rod 370 connecting the intermediate steering levers 365.

For purposes of actuating the steering system, a steering gear 371 is provided which acts by way of a steering arm lever 372 on a steering rod 373 which, as viewed in plan view according to FIG. 8 is disposed underneath the cross bearer 313 and extends in the longitudinal direction thereof and which in the illustration according to FIG. 9 is connected by way of an arm 374 that is non-rotatably arranged on the shaft 367 of the right intermediate steering lever 365. The joint connection between the steering arm lever 372 and the steering rod 373 is designated by $N_3$ and that between the steering rod 373 and the arm 374 by $O_3$. The steering gear 371 is connected in the illustrated embodiment with the frame in a manner not shown in detail and is actuatable by way of a steering spindle. By reason of the fact that the intermediate steering levers 365 connected with the track rods 338 are connected with the cross bearer 313 and are pivotal in unison together with the latter, undesired steering effects do not occur in the arrangement according to the present invention.

In the embodiment according to FIGS. 11 to 13, which with respect to the construction of the upper and lower guide means for the wheel carriers corresponds essentially to that which corresponds to the embodiment according to FIGS. 8 to 10 in conjunction with what has been stated with reference to the embodiment of FIGS. 1 to 3, the track link steering arm together with the linkage appertaining to the steering system, in contradistinction to the embodiment of FIGS. 8 – 10, is arranged at the height of the lower guide member. A track steering and a steering construction as is illustrated in FIGS. 11 to 13 is installed in wheel suspensions according to FIGS. 11 to 13 or also according to FIGS. 8 to 10 only with relatively slight errors as regards a true track-guidance of the wheels 422 because the wheel carrier 410 is so guided in its lower point of pivotal connection $E_4$ by the forward lower guide member 411 that this lower point of pivotal connection $E_4$ exibits a nearly vertical path of movement over a large portion of its spring range. This is achieved in that the lower guide member 411 has an axis of rotation x—x determined by its point of pivotal connection $A_4$ and $B_4$ on the frame-side, which in an approximately horizontal position, extends obliquely forwardly and outwardly in the driving direction l and which has a relatively large distance with respect to the point of pivotal connection $E_4$. The lower guide members 411 in the embodiment according to FIGS. 11 to 13, in contrast to the embodiment according to FIGS. 8 to 10, are not constituted constructively by inherently rigid triangular guide members but instead have rather a triangular guide construction in which the transversely extending arm 475 is connected with the arm 476 extending essentially in the vehicle longitudinal direction by way of a joint 477. The arm 476 is retained on the frame-side in the point of pivotal connection $A_4$ in that it extends with play through a mounting plate 478 fixed with respect to the frame within the area of its end and is clamped with respect to this mounting plate 478 in relation to its longitudinal direction by the interposition of elastic cushions 479. The joint connection forming the point of pivotal connection $B_4$ on the frame-side of the arm 475 consists, in contrast thereto, in a conventional manner of a bush provided with an elastic insert and retained on a pin fixed at the frame.

The track link steering arm 480 is arranged in an embodiment according to FIGS. 11 to 13 at the height of the point of pivotal connection $E_4$ for the lower guide member 411 at the wheel carrier 410 and extends obliquely rearwardly opposite the driving direction. Within the area of its free end, the track link steering lever 480 is connected by way of a joint $P_4$ with the track rod 481 which extends essentially transversely to the driving direction and which is pivotally connected at an intermediate steering lever 482 by way of a joint $Q_4$. Corresponding to the symmetrical construction with respect to the vehicle longitudinal center plane, which is the reason why essentially only one axle side is illustrated in the embodiment according to FIGS. 11 to 13, an intermediate steering lever 482 is coordinated to each axle side and the two intermediate steering levers 482 are connected with each other by way of a track rod 483. In the embodiment, the intermediate steering lever 482 belonging to the right axle side is pivotally retained with respect to the vehicle frame in a manner not illustrated in detail whereas the intermediate steering lever 482 associated with the left axle side is non-rotatably connected with the output shaft 484 of the steering gear 485 fixedly arranged on the frame. The axes of rotation of the two intermediate steering levers 482 extend in the same directions.

At its upper end, the wheel carrier 410 is pivotally connected in the point of pivotal connection $F_4$ with one of the upper and rear guide members 412 which are constructed as triangular guide members and have points of pivotal connection $C_4$ and $D_4$ on the frame-side. Of these points of pivotal connection, the point of pivotal connection $C_4$ is again non-rotatably connected with the torsion rod 414 with respect to the axis of rotation w-w of the cross connection whereas the point of pivotal connection $D_4$ is provided at the cross bearer 413 which receives the torsion rod 414 and is non-rotatably connected with the latter by way of serrations 416 within the area of the vehicle longitudinal center plane. The guide members 412 are also constituted in this embodiment by two arms 434 and 435 which are connected with each other by way of a joint 436. Corresponding to the function of the upper and rear guide means as described by reference to FIGS. 1 to 3, also the upper and rear guide means illustrated in this embodiment possesses a common axis of rotation w—w for the unidirectional spring movements whereas during oppositely directed spring movements, the guide members 412 pivot about the axes of rotation y—y thereof (FIGS. 11 and 12). These axes of rotation y—y are directed in the illustrated embodiment obliquely forwardly as viewed in plan view and, as viewed in rear view according to FIG. 12, have an extension inclined obliquely downwardly toward the vehicle longitudinal center plane.

The guide means used within the scope of the wheel suspensions according to the present invention which include guide members and a cross connection may, of course, also be used according to the present invention for wheel suspensions in which the wheel carriers are each guided exclusively by only one guide means and in which this guide means includes one guide member that possesses different axes of rotation for unidirectional and oppositely directed spring movements and which represents a combination of a longitudinal guide member (unidirectional spring movements) and of an inclined guide member (oppositely directed spring movements).

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A wheel suspension for oppositely disposed wheels of a motor vehicle, which incluldes for each such wheel, guide means and a wheel carrier means guided by said guide means as coupler, said guide means operatively connecting the wheel carrier means with a relatively fixed vehicle frame part, and a cross connection means coupling with each other at least one of the guide means of each such wheel, the mutually coupled guide means coupled with one another by said cross connection means being operable in such a manner that during unidirectional spring movements of the oppositely disposed wheels, the respective guide means have substantially horizontal axis of rotation common to both wheel sides and disposed substantially in a vehicle transverse plane and during oppositely disposed spring movements of the mutually oppositely disposed wheels, one axis of rotation each is effectively formed for each wheel side by the respective guide means which is determined by the points of pivotal connection of the associated guide means at the relatively fixed part, characterized in that the cross connection means includes a cross bearer means rotatable about a substantially horizontal axis fixed with respect to the relatively fixed part and disposed in a vehicle transverse plane, and connecting arm means operatively connected with the mutually coupled guide means, said connecting arm means being adapted to be elastically torsionally stressed with respect to the cross bearer means in relation to the axis of rotation of the latter, said mutually coupled guide means being pivotally connected on the frame-side at the cross connection means by way of points of pivotal connection of which at least the respective inner points of pivotal connection disposed nearer the vehicle longitudinal center plane are provided at the cross bearer means, and the respectively points of pivotal connection for a corresponding one of the coupled guide means being located on a straight line extending, as viewed in rear view, obliquely to the axis of rotation of the cross connection means, and said straight line forming the axis of rotation of the respective guide means for the oppositely disposed spring movements.

2. A wheel suspension according to claim 1, characterized in that said guide means include upper and lower guide means, of which one of the upper and lower guide means belonging respectively to mutually opposite wheel sides are constituted by mutually independent guide means while the other of the upper and lower guide means are constituted by the cross connection means and by mutually coupled guide means coupled with one another by said cross connection means.

3. A wheel suspension according to claim 2, characterized in that the other guide means are constituted by triangular guide members.

4. A wheel suspension according to claim 2, characterized in that the mutually coupled guide means which have the common axis of rotation during unidirectional spring movements and the separate axes of rotation during oppositely disposed spring movements, are the rearwardly extending guide means.

5. A wheel suspension according to claim 2, characterized in that the wheel carrier means are guided in their respective points of pivotal connection at the mutually independent guide means, by said last-mentioned guide means in such a manner that said last-mentioned points of pivotal connection move in approximately vertical movement paths during spring deflections.

6. A wheel suspension according to claim 5, characterized in that the movement of the points of pivotal connection at the wheel-carrier side of the mutually independent guide means extend at least essentially in vertical vehicle longitudinal planes.

7. A wheel suspension according to claim 6, characterized in that the connecting arm means are connected with the cross bearer means by way of elastic torsion elements.

8. A wheel suspension according to claim 7, characterized in that spring elements are provided as torsion elements which are non-rotatably arranged with respect to the cross bearer means.

9. A wheel suspension according to claim 8, characterized in that rubber elements are provided as torsion elements which are non-rotatably arranged with respect to the cross bearer means.

10. A wheel suspension according to claim 9, characterized in that said rubber elements are rubber ring elements.

11. A wheel suspension according to claim 9, characterized in that the torsion elements are arranged surrounding the cross bearer means ring-shaped.

12. A wheel suspension according to claim 7, characterized in that the torsion elements are constituted by torsion rod means extending in the axial direction of the cross bearer means.

13. A wheel suspension according to claim 12, characterized in that the cross bearer means is formed by a hollow cylinder.

14. A wheel suspension according to claim 13, characterized in that the torsion elements formed by torsion rod means are disposed at least over a portion of their length within the hollow cylinder.

15. A wheel suspension according to claim 14, characterized in that the torsion rod means are non-rotatably fixed with respect to the hollow cylinder at the ends thereof disposed within the hollow cylinder by way of serrations.

16. A wheel suspension according to claim 14, characterized in that the torsion elements are constituted by a unitary torsion rod means which is non-rotatably fixed centrally thereof with respect to the hollow cylinder.

17. A wheel suspension according to claim 16, characterized in that the unitary torsion rod means is non-rotatably fixed with respect to the hollow cylinder centrally thereof by serrations.

18. A wheel suspension according to claim 14, characterized in that the cross bearer means and the torsion elements arranged substantially coaxially thereto are rotatably supported in common with respect to the relatively fixed vehicle part.

19. A wheel suspension according to claim 18, characterized in that one bearing support means each coordinated to each wheel side is provided for the common rotatable support of the torsion elements and of the cross bearer means which is rotatable in relation to the relatively fixed part.

20. A wheel suspension according to claim 19, characterized in that with torsion elements formed by torsion rod means, the bearing support means are provided at the torsion rod means within the area of the sections thereof disposed outside of the cross bearer means.

21. A wheel suspension according to claim 20, characterized in that of the two points of pivotal connection on the frame-side of the mutually coupled guide means, the respective outer point of pivotal connection which is diposed farther removed from the vehicle longitudinal center plane, is connected with the associated torsion element and the inner point of pivotal connection which is disposed nearer the vehicle longitudinal center plane, is provided at the cross bearer means.

22. A wheel suspension according to claim 21, characterized in that the point of pivotal connection between the mutually coupled guide means and the torsion elements is each constituted by a swivel joint means disposed on the axis of rotation of the cross connection means and non-rotatable with respect to said last-mentioned axis of rotation.

23. A wheel suspension according to claim 22, characterized in that said mutually coupled guide means include guide arms connected with each other substantially in a point and in that the connection between the two guide arms of a respective guide means is constructed joint-like.

24. A wheel suspension according to claim 23, characterized in that with a rod-shaped construction of the torsion elements, the guide arm respectively connected with the torsion element is constituted by an end portion of a rod-shaped torsion element bent out of the axis of rotation of the cross connection means.

25. A wheel suspension according to claim 24, characterized in that the two points of pivotal connection on the frame-side of the mutually coupled guide means are provided at the cross bearer means.

26. A wheel suspension according to claim 25, characterized in that each torsion element is connected by a respective connecting arm means with the associated one of the mutually coupled guide means.

27. A wheel suspension according to claim 26, characterized in that an inherently substantially rigid transmission member is provided between the connecting arm means and the respective guide means, said transmission member being pivotally connected with at least one of the two parts consisting of connecting arm means and guide means.

28. A wheel suspension according to claim 26, characterized in that said transmission member is pivotally connected with both of said parts consisting of connecting arm means and guide means.

29. A wheel suspension according to claim 27, characterized in that each connecting arm means is formed by a respective bent off end portion of a rod-shaped torsion element.

30. A wheel suspension according to claim 27, characterized in that each connecting arm means is constituted respectively by a lever non-rotatably arranged at the torsion element in relation to the axis of rotation thereof.

31. A wheel suspension according to claim 27, characterized by support means for the cross connection means which are constructed relatively soft with respect to the relatively fixed part in relation to the vehicle longitudinal direction.

32. A wheel suspension with an axle drive according to claim 31, characterized in that the cross connection means is supported at an auxiliary bearer means which is operatively connected in its longitudinal center area with a differential gear dispsosed in the drive connection for the wheels, said auxiliary bearer means being supported together with the differential gear at least in three points with respect to the relatively fixed part.

33. A wheel suspension according to claim 32, characterized in that the relatively fixed part is the vehicle frame.

34. A wheel suspension according to claim 32, characterized in that the support for the auxiliary bearer means and the differential gear on the relatively fixed part are constructed relatively soft at least in relation to the vehicle longitudinal direction.

35. A wheel suspension according to claim 34, characterized in that the mutually coupled guide means are provided as upper guide means for the wheel carrier means.

36. A wheel suspension according to claim 35, characterized in that the axes of rotation of the mutually coupled guide means for the oppositely directed spring movements extend obliquely downwardly toward the vehicle longitudinal center plane, as viewed in rear view.

37. A wheel suspension according to claim 36, characterized in that the axes of rotation of the mutually coupled guide means for the oppositely directed spring movements extend obliquely forwardly toward the vehicle longitudinal center plane as viewed in plan view.

38. A wheel suspension according to claim 37, characterized in that the inner points of pivotal connection on the frame-side of the mutually coupled guide means are provided below the cross connection means.

39. A wheel suspension according to claim 34, characterized in that the mutually coupled guide means are provided as lower guide means for the wheel carrier means.

40. A wheel suspension according to claim 39, characterized in that the axes of rotation of the mutually coupled guide means for oppositely directing spring movements, extend obliquely upwardly toward the vehicle longitudinal center plane, as viewed in rear view.

41. A wheel suspension according to claim 40, characterized in that the axes of rotation of the mutually coupled guide means for oppositely directing spring movements extend obliquely rearwardly toward the vehicle longitudinal center plane as viewed in plan view.

42. A wheel suspension according to claim 41, characterized in that the inner points of pivotal connection on the frame side of the mutually coupled guide means are provided above the cross connection means.

43. A wheel suspension according to claim 34, characterized in that the lower guide means of the wheel carrier means form the respective forward guide means for the wheel carrier means in relation to the vehicle longitudinal direction.

44. A wheel suspension, especially a rear wheel suspension according to claim 43, characterized in that the axes of rotation of the mutually independent guide means extend approximately horizontally.

45. A wheel suspension, especially a rear wheel suspension according to claim 44, characterized in that the axes of rotation of the mutually independent guide means extend transversely to the vehicle longitudinal direction.

46. A wheel suspension, especially a front wheel suspension according to claim 43, characterized in that the axes of rotation of the lower guide means constituted by the mutually independent guide means extend obliquely forwardly and outwardly.

47. A wheel suspension, especially front wheel suspension according to claim 43, characterized in that the axes of rotation of the lower guide means constituted by the mutually independent guide means extend essentially in the vehicle longitudinal direction.

48. A wheel suspension for the oppositely disposed wheels of a motor vehicle according to claim 43, characterized in that a track link steering lever means is coordinated to each of the wheel carrier means, said track link steering lever means being operatively connected with a track rod in a point of pivotal connection which is located substantially at the height of the point of pivotal connection on the wheel-carrier side of the corresponding one of the mutually coupled guide means, said track rod having, as viewed in side view, an approximately similar direction of extension as the corresponding guide means while its point of pivotal connection on the frameside, which is disposed opposite the track link steering lever means, is located within the area of the axis of rotation of said last-mentioned guide means during oppositely directed spring movements and is coordinated to said cross bearer means.

49. A wheel suspension according to claim 48, characterized in that the point of pivotal connection of the respective mutually coupled guide means at the wheel carrier means and the point of pivotal connection of the track rod at the track link steering lever means are located substantially at the same height and in a vertical plane perpendicular to the wheel plane, and in that the length and location of the track rod are deteremined in that the point of pivotal connection on the frame-side of the track rod is located, in a base position for oppositely directed spring movements, on an ideal straight line which, in relation to the straight driving position of the respective wheel, is disposed perpendicular to a plane which, starting from the base position, is defined by the point of pivotal connection of the track rod at the track link steering lever means in its positions corresponding to different spring deflection positions of the wheel during oppositely directed spring movements and with an unchanged track, and extends through said plane in the center point of the curved arc which is described by the point of pivotal connection of the track rod at the track link steering lever means during a spring deflection of the wheel carried out with an unchanged track.

50. A wheel suspension according to claim 49, characterized in that the point of pivotal connection on the frame-side of the track rod is located in the plane determined by the point of pivotal connection of the track rod at the track link steering lever means in its positions corresponding to different spring deflection positions of the wheel from a base position with an unchanged track.

51. A wheel suspension according to claim 50, characterized in that the point of pivotal connection between the track link steering lever means and the track rod is located, as viewed in plan view, at a greater distance to the vehicle longitudinal center plane than the corresponding point of pivotal connection of the corresponding guide means at the wheel carrier means.

52. A wheel suspension according to claim 50, characterized in that the point of pivotal connection between the track link steering lever means and the track rod is located, as viewed in plan view, at a smaller distance from the vehicle longitudinal center plane than the point of pivotal connection of the corresponding guide means at the wheel carrier means.

53. A wheel suspension according to claim 50, characterized in that for purposes of a guidance of the point of pivotal connection on the frame-side of the track rod in such a manner that each of the base positions attainable by undirectional spring mmovements, from which an oppositely directed spring deflection is attainable essentially without track change, is attained without steering effect, a transmission means is provided operable to be driven by way of the cross bearer means and including a further lever means carrying the point of pivotal connection of the track rod on the frame-side.

54. A wheel suspension according to claim 53, characterized in that the further lever means has an axis of rotation disposed substantially parallel to the axis of rotation of the cross bearer means.

55. A wheel suspension according to claim 54, characterized in that the further lever means is arranged on a shaft which is operatively connected with the cross bearer means by a further means providing a transmission ratio.

56. A wheel suspension according to claim 55, characterized in that the pivot axis of the further lever means is given, as viewed in side view, by the center point of a desired curve which represnts the geometric location of points of intersection, whereby in relation to the base positions for the alternate spring movements attained by the unidirectional spring movements and starting with a track rod length determined for a preselected base position, and with the position of the point of pivotal connection on the frame-side of the track rod on the associated ideal straight line, one point of intersection each is determined in each base position by the intersection of a straight line with a circular arc, and whereby said last-mentioned straight line results from the intersection of the ideal plane defined in the respective base position by the associated ideal straight line and the associated point of pivotal connection of the track rod at the track link steering lever means with a vertical plane containing the desired curve and disposed perpendicular to the axis of rotation of the cross bearer means, and said circular arc is described about the point of pivotal connection projected into the vertical plane containing the desired curve of the track rod at the track link steering lever means with the length also projected into said plane of the track rod as determined in its length for the preselected base position.

57. A wheel suspension according to claim 56, characterized in that said transmission means includes a quadrilateral joint linkage which includes a coupler means and two rocker arms, of which one rocker arm is provided at the cross bearer means and the other rocker arm on the shaft.

58. A wheel suspension according to claim 57, characterized in that under the assumption of at least substantially identical pivot paths for the points of pivotal connection of the rocker arms during rotation of the cross bearer means by reason of unidirectional spring deflections, the relative dimensions of the elements of the transmission means are defined by the formula:

$$g = m \cdot \frac{a}{h} \cdot \frac{f}{d}$$

whereby, in relation to a unidirectional spring deflection out of a base position, the terms $a, d, f, g, h$ and $m$ refer in the projection on a vertical plane passing through the point of pivotal connection of the track rod at the further lever means and disposed perpendicularly to the axis of rotation of the cross bearer means, to the following dimensions:

- a the pivot path of the point of pivotal connection of the track rod at the track link steering lever means,
- d the pivot path of the pivotal connection of the track rod at said further lever means,
- f the length of the further lever means non-rotatably connected with the shaft,
- g the length of the rocker arm non-rotatably connected with said shaft,
- h the pivot radius for the point of pivotal connection of the track rod at the track link steering lever means during unidirectional spring movemments, and
- m the length of the rocker arm non-rotatably connected with the cross bearer means.

59. A wheel suspension according to claim 58, characterized in that the other guide means are constituted by triangular guide members.

60. A wheel suspension according to claim 1, characterized in that the connecting arm means are connected with the cross bearer means by way of elastic torsion elements.

61. A wheel suspension according to claim 60, characterized in that spring elements are provided as torsion elements which are non-rotatably arranged with respect to the cross bearer means.

62. A wheel suspension according to claim 60, characterized in that rubber elements are provided as torsion elements which are non-rotatably arranged with respect to the cross bearer means.

63. A wheel suspension according to claim 62, characterized in that said rubber elements are rubber ring elements.

64. A wheel suspension according to claim 60, characterized in that the torsion elements are arranged surrounding the cross bearer means ring-shaped.

65. A wheel suspension according to claim 60, characterized in that the torsion elements are constituted by torsion rod means extending in the axial direction of the cross bearer means.

66. A wheel suspension according to claim 1, characterized in that the cross bearer means is formed by a hollow cylinder.

67. A wheel suspension according to claim 66, characterized in that the torsion elements formed by torsion rod means are disposed at least over a portion of their length within the hollow cylinder.

68. A wheel suspension according to claim 67, characterized in that the torsion rod means are non-rotatably fixed with respect to the hollow cylinder at the ends thereof disposed within the hollow cylinder by way of serrations.

69. A wheel suspension according to claim 67, characterized in that the torsion elements are constituted by a unitary torsion rod means which is non-rotatably fixed centrally thereof with respect to the hollow cylinder.

70. A wheel suspension according to claim 69, characterized in that the unitary torsion rod means is non-rotatably fixed with respect to the hollow cylinder centrally thereof by serrations.

71. A wheel suspension according to claim 60, characterized in that the cross bearer means and the torsion elements arranged substantially coaxially thereto are rotatably supported in common with respect to the relatively fixed vehicle part.

72. A wheel suspension according to claim 71, characterized in that one bearing support means each coordinated to each such wheel is provided for the common rotatable support of the torsion elements and of the cross bearer means which is rotatable in relation to the relatively fixed part.

73. A wheel suspension according to claim 72, characterized in that with torsion elements formed by torsion rod means, the bearing support means are provided at the torsion rod means within the area of the sections thereof disposed outside of the cross bearer means.

74. A wheel suspension according to claim 60, characterized in that of the two points of pivotal connection on the frame-side of the mutually coupled guide means, the respective outer point of pivotal connection which is disposed farther removed from the vehicle longitudinal center plane, is connected with the associated torsion element and the inner point of pivotal connection which is disposed nearer the vehicle longitudinal center plane, is provided at the cross bearer means.

75. A wheel suspension according to claim 74, characterized in that the point of pivotal connection between the mutually coupled guide means and the torsion elements is each constituted by a swivel joint means disposed on the axis of rotation of the cross connection means and non-rotatable with respect to said last-mentioned axis of rotation.

76. A wheel suspension according to claim 60, characterized in that said mutually coupled guide means include guide arms connected with each other substantially in a point and in that the connection between the two guide arms of a respective guide means is constructed joint-like.

77. A wheel suspension according to claim 76, characterized in that with a rod-shaped construction of the torsion elements, the guide arm respectively connected with the torsion element is constituted by an end portion of a rod-shaped torsion element bent out of the axis of rotation of the cross connection means.

78. A wheel suspension according to claim 60, characterized in that the two points of pivotal connection on the frame-side of the mutually coupled guide means are provided at the cross bearer means.

79. A wheel suspension according to claim 78, characterized in that each torsion element is connected by a respective connecting arm means with the associated one of the mutually coupled guide means.

80. A wheel suspension according to claim 79, characterized in that an inherently substantially rigid transmission member is provided between the connecting arm means and the respective guide means, said transmission member being pivotally connected with at least one of the two parts consisting of connecting arm means and guide means.

81. A wheel suspension according to claim 80, characterized in that said transmission member is pivotally connected with both of said parts consisting of connecting arm means and guide means.

82. A wheel suspension according to claim 78, characterized in that each connecting arm means is formed by a respective bent off end portion of a rod-shaped torsion element.

83. A wheel suspension according to claim 78, characterized in that each connecting arm means is constituted respectively by a lever non-rotatably arranged at the torsion element in relation to the axis of rotation thereof.

84. A wheel suspension according to claim 60, characterized by support means for the cross connection means which are constructed relatively soft with respect to the relatively fixed part in relation to the vehicle longitudinal direction.

85. A wheel suspension, especially a rear wheel suspension with a rear axle drive according to claim 1, characterized in that the cross connection means is supported at an auxiliary bearer means which is operatively connected in its longitudinal center area with a differential gear disposed in the drive connection for the rear wheels, said auxiliary bearer means being supported together with the differential gear at least in three points with respect to the relatively fixed part.

86. A wheel suspension according to claim 85, characterized in that the support for the auxiliary bearer means and the differential gear on the relatively fixed part are constructed relatively soft at least in relation to the vehicle longitudinal direction.

87. A wheel suspension according to claim 2, characterized in that the mutually coupled guide means are provided as upper guide means for the wheel carrier means.

88. A wheel suspension according to claim 87, characterized in that the axes of rotation of the mutually coupled guide means for the oppositely directed spring movements extend obliquely downwardly toward the vehicle longitudinal center plane, as viewed in rear view.

89. A wheel suspension according to claim 87, characterized in that the axes of rotation of the mutually coupled guide means for the oppositely directed spring movements extend obliquely forwardly toward the vehicle longitudinal center plane as viewed in plan view.

90. A wheel suspension according to claim 87, characterized in that the inner points of pivotal connection on the frame-side of the mutually coupled guide means are provided below the cross connection means.

91. A wheel suspension according to claim 2, characterized in that the mutually coupled guide means are provided as lower guide means for the wheel carrier means.

92. A wheel suspension according to claim 91, characterized in that the axes of rotation of the mutually coupled guide means for oppositely directed spring movements, extend obliquely upwardly toward the vehicle longitudinal center plane, as viewed in rear view.

93. A wheel suspension according to claim 91, characterized in that the axes of rotation of the mutually coupled guide means for opositely directed spring movements extend obliquely rearwardly toward the vehicle longitudinal center plane as viewed in plan view.

94. A wheel suspension according to claim 91, characterized in that the inner points of pivotal connection on the frame-side of the mutually coupled guide means are provided above the cross connection means.

95. A wheel suspension according to claim 2, characterized in that the lower guide means of the wheel carrier means form the respective forward guide means for the wheel carier means in relation to the vehicle longitudinal direction.

96. A wheel suspension, especially a rear wheel suspension according to claim 1, characterized in that the axes of rotation of the mutually independent guide means extend approximately horizontally.

97. A wheel suspension, especially a rear wheel suspension according to claim 1, characterized in that the axes of rotation of the mutually independent guide means extend transversely to the vehicle longitudinal direction.

98. A wheel suspension, especially a front wheel suspension according to claim 1, characterized in that the axes of rotation of the lower guide means constituted by the mutually independent guide means extend obliquely forward and outwardly.

99. A wheel suspension, especially a front wheel suspension according to claim 1, characterized in that the axes of rotation of the lower guide means constituted by the mutually independent guide means extend essentially in the vehicle longitudinal direction.

100. A wheel suspension, especially a front wheel suspension according to claim 99, chharacterized in that the axes of rotation of the lower guide means constituted by the mutually independent guide means extend obliquely forwardly and outwardly.

101. A wheel suspension for the oppositely disposed wheels of a motor vehicle according to claim 1, characterized in that a track link steering lever means is coordinated to each of the wheel carrier means, said track link steering lever means being operatively connected with a track rod in a point of pivotal connection which is located substantially at the height of the point of pivotal connection on the wheel-carrier side of the corresponding one of the mutually coupled guide means, said track rod having, as viewed in side view, an approximately similar direction of extension as the corresponding guide means while its point of pivotal connection on the frame-side, which is disposed opposite the track link steering lever means, is located within the area of the axis of rotation of said last-mentioned guide means during oppositely directed spring movements and is coordinated to said cross bearer means.

102. A wheel suspension according to claim 101, characterized in that the point of pivotal connection of the respective mutually coupled guide means at the wheel carrier means and the point of pivotal connection of the track rod at the track link steering lever means are located substantially at the same height and in a vertical plane perpendicular to the wheel plane, and in that the length and location of the track rod are determined in that the point of pivotal connection on the frame-side of the track rod is located, in a base position for oppositely directed spring movements, on an ideal straight line which, in relation to the straight driving position of the respective wheel, is disposed perpendicular to a plane which, starting from the base position, is defined by the point of pivotal connection of the track rod at the track link steering lever means in its positions corresponding to different spring deflection positions of the wheel during oppositely directed spring movements and with an unchanged track, and extends through said plane in the center point of the curved arc which is described by the point of pivotal connection of the track rod at the track link steering level means during a spring deflection of the wheel carried out with an unchanged track.

103. A wheel suspension according to claim 101, characterized in that the point of pivotal connection on the frame-side of the track rod is located in the plane determined by the point of pivotal connection of the track rod at the track link steering lever means in its positions corresponding to different spring deflection positions of the wheel from a base position with an unchanged track.

104. A wheel suspension according to claim 101, characterized in that the point of pivotal connection between the track link steering lever means and the track rod is located, as viewed in plan view, at a greater distance to the vehicle longitudinal center plane than the corresponding point of pivotal connection of the corresponding guide means at the wheel carrier means.

105. A wheel suspension according to claim 101, characterized in that the point of pivotal connection between the track link steering lever means and the track rod is located, as viewed in plan view, at a smaller distance from the vehicle longitudinal center plane than the point of pivotal connection of the corresponding guide means at the wheel carrier means.

106. A wheel suspension according to claim 101, characterized in that for purposes of a guidance of the point of pivotal connection on the frame-side of the track rod in such a manner that each of the base positions attainable by unidirectional spring movements, from which an oppositely directed spring deflection is attainable essentially without track change, is attained without steering effect, a transmission means is provided operable to be driven by way of the cross bearer means and including a further lever means carrying the point of pivotal connection of the track rod on the frame side.

107. A wheel suspension according to claim 106, characterized in that the further lever means has an axis of rotation disposed substantially parallel to the axis of rotation of the cross bearer means.

108. A wheel suspension according to claim 106, characterized in that the further lever means is arranged on a shaft which is operatively connected with the cross bearer means by a further means providing a transmission ratio.

109. A wheel suspension according to claim 106, characterized in that the pivot axis of the further lever means is given, as viewed in side view, by the center point of a desired curve which represents the geometric location of points of intersection, whereby in relation to the base positions for the alternate spring movements attained by the unidirectional spring movements and starting with a track rod length determined for a preselected base position, and with the position of the point of pivotal connection on the frame-side of the track rod on the associated ideal straight line, one point of intersection each is determined in each base position by the intersection of a straight line with a circular arc, and whereby said last-mentioned straight line results from the intersection of the ideal plane defined in the respective base position by the associated ideal straight line and the associated point of pivotal connection of the track rod at the track link steering lever means with a vertical plane containing the desired curve and disposed perpendicular to the axis of rotation of the cross bearer means, and said circular arc is described about the point of pivotal connection projected into the vertical plane containing the desired curve of the track rod at the track link steering lever means with the length also projected into said plane of the track rod as determined in its length for the preselected base position.

110. A wheel suspension according to claim 106, characterized in that said transmission means includes a quadrilateral joint linkage which includes a coupler means and two rocker arms, of which one rocker arm is provided at the cross bearer means and the other rocker arm on the shaft.

111. A wheel suspension according to claim 110, characterized in that under the assumption of at least substantially identical pivot paths for the points of pivotal connection of the rocker arms during rotation of the cross bearer means by reason of unidirectional spring deflections, the relative dimensions of the elements of the transmission means are defined by the formula $$g = m \cdot \frac{a}{h} \cdot \frac{f}{d}$$

whereby, in relation to a unidirectional spring deflection out of a base position, the terms $a, d, f, g, h$ and $m$ refer in the projection on a vertical plane passing through the point of pivotal connection of the track rod at the further lever means and disposed perpendicularly to the axis of rotation of the cross bearer means, to the following dimensions:

$a$ the pivot path of the point of pivotal connection of the track rod at the track link steering lever means, $d$ the pivot path of the pivotal connection of the track rod at said further lever means, $f$ the length of the further lever means non-rotatably connected with the shaft, $g$ the length of the rocker arm non-rotatably connected with said shaft, $h$ the pivot radius for the point of pivotal connection of the track rod at the track link steering lever means during unidirectional spring movements, and $m$ the length of the rocker arm non-rotatably connected with the cross bearer means.

* * * * *